(12) United States Patent
Chen

(10) Patent No.: US 12,072,555 B2
(45) Date of Patent: *Aug. 27, 2024

(54) PHOTOGRAPHING SYSTEM, IMAGE CAPTURING UNIT AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,333

(22) Filed: Jun. 8, 2023

(65) Prior Publication Data

US 2023/0358999 A1   Nov. 9, 2023

Related U.S. Application Data

(63) Continuation of application No. 17/152,321, filed on Jan. 19, 2021, now Pat. No. 11,714,264, which is a
(Continued)

(30) Foreign Application Priority Data

Feb. 17, 2015   (TW) .................. 104105620

(51) Int. Cl.
*G02B 9/64* (2006.01)
*G02B 13/00* (2006.01)
(Continued)

(52) U.S. Cl.
CPC ........... *G02B 9/64* (2013.01); *G02B 13/0045* (2013.01); *G02B 5/005* (2013.01); *G02B 13/002* (2013.01); *G02B 13/18* (2013.01); *G02B 27/0025* (2013.01)

(58) Field of Classification Search
CPC ...... G02B 9/64; G02B 13/0045; G02B 5/005; G02B 13/002; G02B 13/18; G02B 27/0025

See application file for complete search history.

(56) References Cited

U.S. PATENT DOCUMENTS 4,948,238 A   8/1990   Araki et al.
6,185,050 B1  2/2001   Ota et al.
(Continued)

FOREIGN PATENT DOCUMENTS

CN   203673137 U   6/2014
CN   203941337 U   11/2014
(Continued)

OTHER PUBLICATIONS

TW Office Action dated Oct. 1, 2015 as received in Application No. 104105620.

*Primary Examiner* — George G. King
(74) *Attorney, Agent, or Firm* — Maschoff Brennan

(57) ABSTRACT

A photographing system includes, in order from an object side to an image side, a first lens element, a second lens element, a third lens element, a fourth lens element, a fifth lens element, a sixth lens element and a seventh lens element with refractive power. The first lens element with positive refractive power has an object-side surface being convex in paraxial region. The second lens element with refractive power has an image-side surface being concave in paraxial region. The third, fourth and fifth lens elements all have refractive powers. The sixth lens element with refractive power has an image-side surface being concave in paraxial region, wherein the image-side surface has at least one convex shape in off-axis region, and both of two surfaces are aspheric. The seventh lens element with refractive power has
(Continued)

an object-side surface being concave in paraxial region, and both of two surfaces are aspheric.

20 Claims, 19 Drawing Sheets

Related U.S. Application Data continuation of application No. 16/847,453, filed on Apr. 13, 2020, now Pat. No. 10,928,610, which is a continuation of application No. 16/031,912, filed on Jul. 10, 2018, now Pat. No. 10,656,385, which is a continuation of application No. 15/868,887, filed on Jan. 11, 2018, now Pat. No. 10,048,471, which is a continuation of application No. 15/618,052, filed on Jun. 8, 2017, now Pat. No. 9,904,038, which is a continuation of application No. 14/740,000, filed on Jun. 15, 2015, now Pat. No. 9,706,093.

(51) Int. Cl.
*G02B 5/00* (2006.01)
*G02B 13/18* (2006.01)
*G02B 27/00* (2006.01)

(56) References Cited

U.S. PATENT DOCUMENTS

| | | | |
|---|---|---|---|
| 8,599,495 B1 | 12/2013 | Tsai et al. | |
| 8,670,194 B2 | 3/2014 | Yoshinaga et al. | |
| 8,717,682 B2 | 5/2014 | Yoshinaga et al. | |
| 9,063,318 B2 | 6/2015 | Ishizaka | |
| 9,146,380 B2 | 9/2015 | Kubota et al. | |
| 9,383,553 B2 | 7/2016 | Shinohara et al. | |
| 9,448,386 B2 | 9/2016 | Kubota et al. | |
| 9,706,093 B2 | 7/2017 | Chen | |
| 9,720,211 B2 | 8/2017 | Ishizaka | |
| 9,904,038 B2 | 2/2018 | Chen | |
| 10,048,471 B2 | 8/2018 | Chen | |
| 10,067,313 B2 | 9/2018 | Kubota et al. | |
| 10,114,196 B2 | 10/2018 | Dai et al. | |
| 10,151,901 B1 | 12/2018 | Oinuma et al. | |
| 10,156,704 B1 | 12/2018 | Sato et al. | |
| 10,222,589 B1 | 3/2019 | Oinuma et al. | |
| 10,247,922 B1 | 4/2019 | Oinuma et al. | |
| 10,268,023 B1 | 4/2019 | Oinuma et al. | |
| 10,281,688 B1 | 5/2019 | Oinuma et al. | |
| 10,488,633 B2 | 11/2019 | Matsumoto | |
| 10,656,385 B2 | 5/2020 | Chen | |
| 10,761,298 B2 | 9/2020 | Fan et al. | |
| 10,928,610 B2 | 2/2021 | Chen | |
| 2013/0329306 A1 | 12/2013 | Tsai et al. | |
| 2014/0009843 A1* | 1/2014 | Tsai | G02B 9/64 359/708 |
| 2014/0139719 A1 | 5/2014 | Fukaya | |
| 2014/0160580 A1 | 6/2014 | Nishihata et al. | |
| 2014/0211324 A1 | 7/2014 | Ishizaka | |
| 2014/0253782 A1 | 9/2014 | Tsai et al. | |
| 2014/0376105 A1 | 12/2014 | Sekine | |
| 2015/0009578 A1 | 1/2015 | Shinohara et al. | |
| 2015/0070783 A1 | 3/2015 | Hashimoto | |
| 2015/0103414 A1 | 4/2015 | Baik | |
| 2015/0268448 A1 | 9/2015 | Kubota et al. | |
| 2015/0378131 A1 | 12/2015 | Tang et al. | |
| 2016/0025953 A1 | 1/2016 | Jung | |
| 2016/0033742 A1 | 2/2016 | Huang | |
| 2016/0124191 A1 | 5/2016 | Hashimoto | |
| 2016/0131874 A1 | 5/2016 | Tang et al. | |
| 2016/0154214 A1 | 6/2016 | Ishizaka | |
| 2016/0231533 A1 | 8/2016 | Mercado | |
| 2016/0282587 A1 | 9/2016 | Hashimoto | |
| 2016/0299319 A1* | 10/2016 | Tang | G02B 13/0045 |
| 2016/0377839 A1 | 12/2016 | Chen et al. | |
| 2017/0357081 A1 | 12/2017 | Dai et al. | |
| 2018/0106984 A1 | 4/2018 | Tang et al. | |
| 2019/0121067 A1 | 4/2019 | Oinuma et al. | |
| 2019/0121068 A1 | 4/2019 | Oinuma et al. | |
| 2019/0121069 A1 | 4/2019 | Oinuma et al. | |
| 2019/0121080 A1 | 4/2019 | Oinuma et al. | |
| 2019/0129139 A1 | 5/2019 | Oinuma et al. | |
| 2019/0129140 A1 | 5/2019 | Oinuma et al. | |
| 2019/0129141 A1 | 5/2019 | Oinuma et al. | |
| 2019/0129142 A1 | 5/2019 | Oinuma et al. | |
| 2019/0204551 A1 | 7/2019 | Oinuma et al. | |
| 2020/0233180 A1 | 7/2020 | Hsueh et al. | |
| 2020/0241244 A1 | 7/2020 | Chen | |
| 2020/0249434 A1 | 8/2020 | Lin et al. | |

FOREIGN PATENT DOCUMENTS

| | | |
|---|---|---|
| CN | 203965708 U | 11/2014 |
| CN | 204065534 U | 12/2014 |
| CN | 204065539 U | 12/2014 |
| CN | 204314533 U | 5/2015 |
| JP | S63-292106 A | 11/1988 |
| JP | H11-281888 A | 10/1999 |
| JP | 2005-156829 A | 6/2005 |
| JP | 2012-002906 A | 1/2012 |
| JP | 2012-155223 A | 8/2012 |
| TW | 201514531 A | 4/2015 |
| WO | 2012/026069 A1 | 3/2012 |
| WO | 2012/026070 A1 | 3/2012 |
| WO | 2015/159721 A1 | 10/2015 |
| WO | 2016/109938 A1 | 7/2016 |
| WO | 2016/110883 A1 | 7/2016 |

\* cited by examiner

PHOTOGRAPHING SYSTEM, IMAGE CAPTURING UNIT AND ELECTRONIC DEVICE

RELATED APPLICATIONS

This application is a continuation patent application of U.S. application Ser. No. 17/152,321, filed on Jan. 19, 2021, which is a continuation patent application of U.S. application Ser. No. 16/847,453, filed on Apr. 13, 2020, which is a continuation patent application of U.S. application Ser. No. 16/031,912, filed on Jul. 10, 2018, which is a continuation patent application of U.S. application Ser. No. 15/868,887, filed on Jan. 11, 2018, which is a continuation patent application of U.S. application Ser. No. 15/618,052, filed on Jun. 8, 2017, which is a continuation patent application of U.S. application Ser. No. 14/740,000, filed on Jun. 15, 2015, which claims priority to Taiwan Application Serial Number 104105620, filed Feb. 17, 2015, which is incorporated by reference herein in its entirety.

BACKGROUND

Technical Field

The present disclosure relates to a photographing system, an image capturing unit and an electronic device, more particularly to a photographing system and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a lens structure with fewer lens elements, such as five or six lens elements. Due to the popularity of electronic devices with high-end specifications, such as smart phones and wearable apparatus, the requirements for high resolution and image quality of present compact optical systems increase significantly. However, the conventional optical systems cannot satisfy these requirements of the compact optical systems.

Other conventional compact optical systems with seven-element lens structure are developed. However, the conventional compact optical systems with seven lens elements are unfavorable for keeping the optical system compact. Therefore, there is an increasing demand to develop an optical system which satisfies the requirements of high image quality and compact size simultaneously while having a large aperture and a large image sensor.

SUMMARY

According to one aspect of the present disclosure, a photographing system includes, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The second lens element with refractive power has an image-side surface being concave in a paraxial region thereof. The third lens element has refractive power. The fourth lens element has refractive power. The fifth lens element has refractive power. The sixth lens element with refractive power has an image-side surface being concave in a paraxial region thereof, wherein the image-side surface of the sixth lens element has at least one convex shape in an off-axis region thereof, and an object-side surface and the image-side surface of the sixth lens element are both aspheric. The seventh lens element with refractive power has an object-side surface being concave in a paraxial region thereof, wherein the object-side surface and an image-side surface of the seventh lens element are both aspheric. The photographing system has a total of seven lens elements with refractive power. The first lens element, the second lens element, the third lens element, the fourth lens element, the fifth lens element, the sixth lens element and the seventh lens element are all stationary relative to one another in a paraxial region thereof. There is an air gap in a paraxial region between every two of the first lens element, the second lens element, the third lens element, the fourth lens element, the fifth lens element, the sixth lens element and the seventh lens element that are adjacent to each other. When a focal length of the photographing system is f, a curvature radius of the image-side surface of the sixth lens element is R12, a curvature radius of the object-side surface of the seventh lens element is R13, the following condition is satisfied:

$$0.30 < (f/R12) - (f/R13).$$

According to another aspect of the present disclosure, an image capturing unit includes an image sensor and the aforementioned photographing system, wherein the image sensor is disposed on the image side of the photographing system.

According to still another aspect of the present disclosure, an electronic device includes the aforementioned image capturing unit.

According to yet another aspect of the present disclosure, a photographing system includes, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The second lens element has negative refractive power. The third lens element has refractive power. The fourth lens element has refractive power. The fifth lens element has refractive power. The sixth lens element with refractive power has an image-side surface being concave in a paraxial region thereof, wherein the image-side surface of the sixth lens element has at least one convex shape in an off-axis region thereof, and an object-side surface and the image-side surface of the sixth lens element are both aspheric. The seventh lens element with refractive power has an object-side surface being concave in a paraxial region thereof, wherein the object-side surface and an image-side surface of the seventh lens element are both aspheric. The photographing system has a total of seven lens elements with refractive power. The first lens element, the second lens element, the third lens element, the fourth lens element, the fifth lens element, the sixth lens element and the seventh lens element are all stationary relative to one another in a paraxial region thereof. There is an air gap in a paraxial region between every two of the first lens element, the second lens element, the third lens element, the fourth lens element, the fifth lens element, the sixth lens element and the seventh lens element that are adjacent to each other. When a focal length of the photographing system is f, a curvature radius of the image-side surface of the sixth lens element is R12, a curvature radius of the object-side surface of the seventh lens element is R13, an Abbe number of the first lens element is V1, an Abbe number of the second lens element is V2, and the following conditions are satisfied:

0.30<(f/R12)−(f/R13); and

25<V1−V2<45.

According to yet still another aspect of the present disclosure, an image capturing unit includes an image sensor and the aforementioned photographing system, wherein the image sensor is disposed on the image side of the photographing system.

According to yet still another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
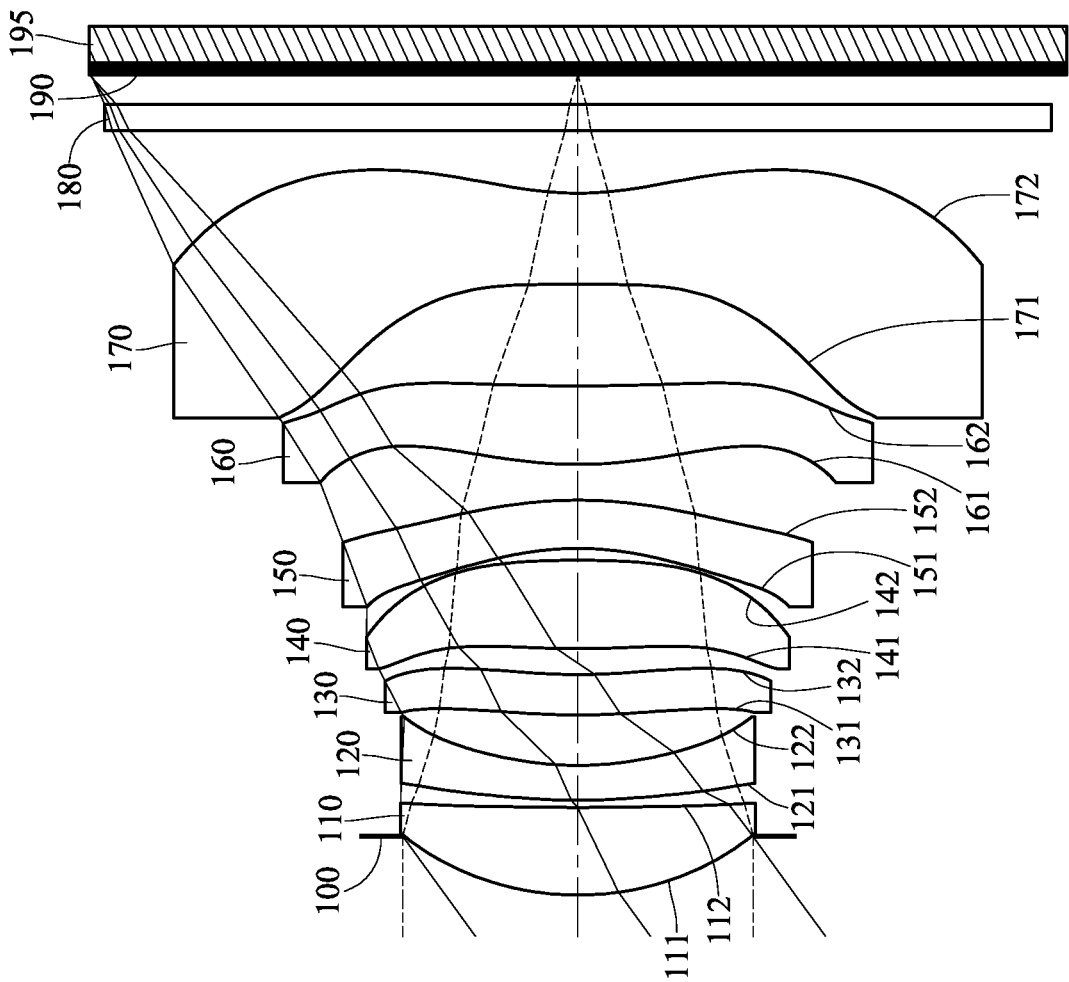
FIG. 1 is a schematic view of an image capturing unit according to the 1st embodiment of the present disclosure.

A photographing system includes, in order from an object side to an image side, a first lens element, a second lens element, a third lens element, a fourth lens element, a fifth lens element, a sixth lens element and a seventh lens element. The photographing system has a total of seven lens elements with refractive power.

According to the present disclosure, there is an air gap in a paraxial region arranged between every two of the first lens element, the second lens element, the third lens element, the fourth lens element, the fifth lens element, the sixth lens element, and the seventh lens element that are adjacent to each other, that is, each of the first through seventh lens elements of the photographing system is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the photographing system. Therefore, having an air gap in a paraxial region between every two of the lens elements that are adjacent to each other in the present disclosure is favorable for avoiding problems generated by the cemented lens elements. Furthermore, the first lens element, the second lens element, the third lens element, the fourth lens element, the fifth lens element, the sixth lens element and the seventh lens element are all stationary relative to one another in a paraxial region thereof. That is, the aforementioned air gaps are all constant.

The first lens element with positive refractive power has an object-side surface being convex in a paraxial region thereof. Therefore, the first lens element provides the photographing system with sufficient positive refractive power. Furthermore, it is favorable for obtaining a proper total track length of the photographing system.

The second lens element can have negative refractive power. The second lens element can have an image-side surface being concave in a paraxial region thereof. Therefore, it is favorable for correcting the aberration from the first lens element so as to improve the image quality.

The third lens element and the fourth lens element both have refractive power. Therefore, it is favorable for properly distributing the refractive power so as to balance the arrangement of the refractive powers of the photographing system.

The fifth lens element with refractive power can have an image-side surface being convex in a paraxial region thereof. Therefore, it is favorable for correcting the astigmatism of the photographing system.

The sixth lens element with refractive power has an image-side surface being concave in a paraxial region and at least one convex shape in an off-axis region thereof. The sixth lens element can have an object-side surface being convex in a paraxial region and at least one concave shape in an off-axis region thereof. Therefore, it is favorable for the principal point of the photographing system being positioned away from the image side of the photographing system so as to reduce a back focal track length of the photographing system, thereby keeping a compact size thereof. Furthermore, it is favorable for effectively reducing the incident angle of the light projecting onto the image sensor and improving the image-sensing efficiency of the image sensor to further correct the aberration of the off-axis region.

Figure 17:
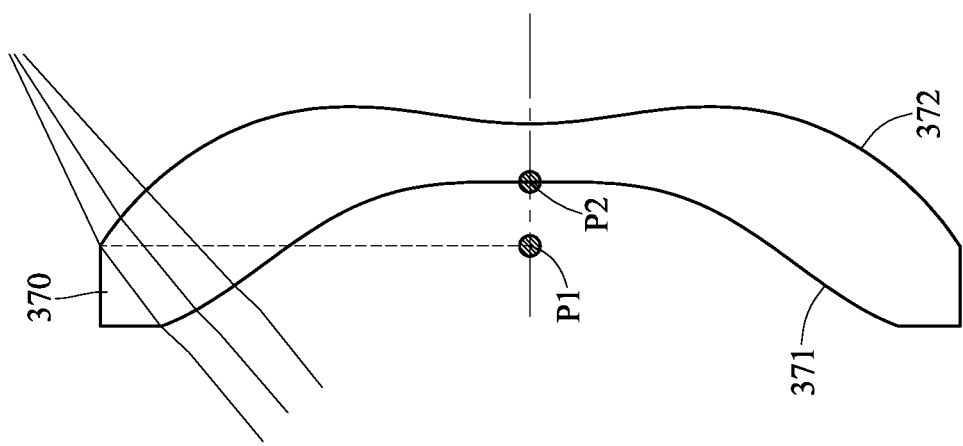
FIG. 17 is a schematic view of a projection of a position of a maximum effective radius of an image-side surface of a seventh lens element on an optical axis and an intersection of an object-side surface of a seventh lens element and the optical axis in FIG. 5.

The seventh lens element can have negative refractive power. The seventh lens element has an object-side surface being concave in a paraxial region thereof. The seventh lens element can have an image-side surface being concave in a paraxial region and at least one convex shape in an off-axis region thereof. Therefore, the curvatures of the sixth lens element and the seventh lens element are favorable for an exit pupil of the photographing system being positioned towards an image surface of the photographing system so as to effectively reduce the back focal length, thereby keeping a compact size thereof. In some embodiments, a projection P1 of a position of a maximum effective radius of the image-side surface of the seventh lens element on an optical axis is closer to the object side of the photographing system than an intersection P2 of the object-side surface of the seventh lens element and the optical axis. Therefore, it is favorable for correcting the distortion at the peripheral region of the image. As seen in FIG. 17, which shows a schematic view of a projection of a position of a maximum effective radius of an image-side surface of a seventh lens element on an optical axis and an intersection of an object-side surface of a seventh lens element and the optical axis in FIG. 5.

When a focal length of the photographing system is f, a curvature radius of the image-side surface of the sixth lens element is R12, a curvature radius of the object-side surface of the seventh lens element is R13, the following condition is satisfied: $0.30<(f/R12)-(f/R13)$. Therefore, it is favorable for effectively allocating the curvatures of the sixth lens element and the seventh lens element so as to reduce the sensitivity of the photographing system and increase the manufacturing yield rate. Preferably, the following condition is satisfied: $0.40<(f/R12)-(f/R13)<3.5$. More preferably, the following condition is satisfied: $0.50<(f/R12)-(f/R13)<3.0$.

When an Abbe number of the first lens element is V1, an Abbe number of the second lens element is V2, the following condition is satisfied: $25<V1-V2<45$. Therefore, it is favorable for correcting the chromatic aberration of the photographing system.

When the focal length of the photographing system is f, a composite focal length of the third lens element, the fourth lens element and the fifth lens element is f345, the following condition can be satisfied: $-0.30<f/f345<0.60$. Therefore, it is favorable for properly distributing the refractive powers of the third lens element, the fourth lens element and the fifth lens element so as to prevent the refractive power from overly concentrated on a single lens element, thereby avoiding excessive aberration.

When a focal length of the x-th lens element is fx, (for example, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7), the following conditions can be satisfied: $|f1|<|fx|$ and $|f7|<|fx|$, wherein x=2, 3, 4, 5, 6. Therefore, it is favorable for balancing the refractive power of the photographing system. Furthermore, it is favorable for correcting the aberration of the photographing system.

When an axial distance between the object-side surface of the first lens element and an image-side surface of the fourth lens element is Dr1r8, an axial distance between an object-side surface of the fifth lens element and the image-side surface of the seventh lens element is Dr9r14, the following condition can be satisfied: $0.75<Dr1r8/Dr9r14<1.5$. Therefore, it is favorable for properly arranging the axial distances between every two adjacent lens elements so as to reduce the total track length of the photographing system.

When the focal length of the first lens element is f1, the focal length of the second lens element is f2, the following condition can be satisfied: $|f1/f2|<0.80$. Therefore, it is favorable for reducing the total track length and correcting the aberration of the photographing system.

When an f-number of the photographing system is Fno, the following condition can be satisfied: $Fno \leq 2.25$. Therefore, it is favorable for receiving sufficient incoming light so as to increase the image quality in a low light condition with a shutter at a high speed.

When the focal length of the photographing system is f, the focal length of the third lens element is f3, the focal length of the fourth lens element is f4, the focal length of the fifth lens element is f5, the following condition can be satisfied: $|f/f3|+|f/f4|+|f/f5|<1.5$. Therefore, it is favorable for balancing the refractive power of the photographing system so as to effectively correct the aberration and reducing the sensitivity of the photographing system.

When a sum of axial distances being respectively between every two lens elements of the first lens element, the second lens element, the third lens element, the fourth lens element, the fifth lens element, the sixth lens element and the seventh lens element that are adjacent to each other is $\Sigma AT$; that is, a sum of an axial distance between the first lens element and the second lens element, an axial distance between the second lens element and the third lens element, an axial distance between the third lens element and the fourth lens element T34, an axial distance between the fourth lens element and the fifth lens element T45, an axial distance between the fifth lens element and the sixth lens element and an axial distance between the sixth lens element and the seventh lens element, and the following condition can be satisfied: $3.0<\Sigma AT/(T34+T45)<10.0$. Therefore, the axial distances of the lens elements are properly arranged so that it is favorable for reducing the total track length of the photographing system so as to keep a compact size thereof.

According to the present disclosure, an axial distance between the sixth lens element and the seventh lens element can be the largest among the axial distances being respectively between every two lens elements of the first lens element, the second lens element, the third lens element, the fourth lens element, the fifth lens element, the sixth lens element and the seventh lens element that are adjacent to each other. Therefore, it is favorable for tightly arranging the lens elements so as to reduce the total track length of the photographing system, thereby keeping the photographing system in a compact size.

When the Abbe number of the second lens element is V2, the following condition can be satisfied: $10<V2<30$. Therefore, it is favorable for correcting the chromatic aberration of the photographing system.

According to the present disclosure, an aperture stop can be configured as a front stop or a middle stop. A front stop disposed between an imaged object and the first lens element can produce a telecentric effect by providing a longer distance between an exit pupil of the photographing system and the image surface and thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the photographing system can be made of glass or plastic material. When the lens elements are made of glass material, the refractive power distribution of the photographing system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an image surface of the photographing system, based on the corresponding image sensor, can be flat or curved, especially a curved surface being concave facing towards the object side of the photographing system.

According to the present disclosure, the photographing system can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the photographing system according to the aforementioned photographing system of the present disclosure, and an image sensor, wherein the image sensor is disposed on the image side of the aforementioned photographing system, that is, the image sensor can be disposed on or near an image surface of the aforementioned photographing system. In some embodiments, the image capturing unit can further include a barrel member, a holding member or a combination thereof.

Figure 19:
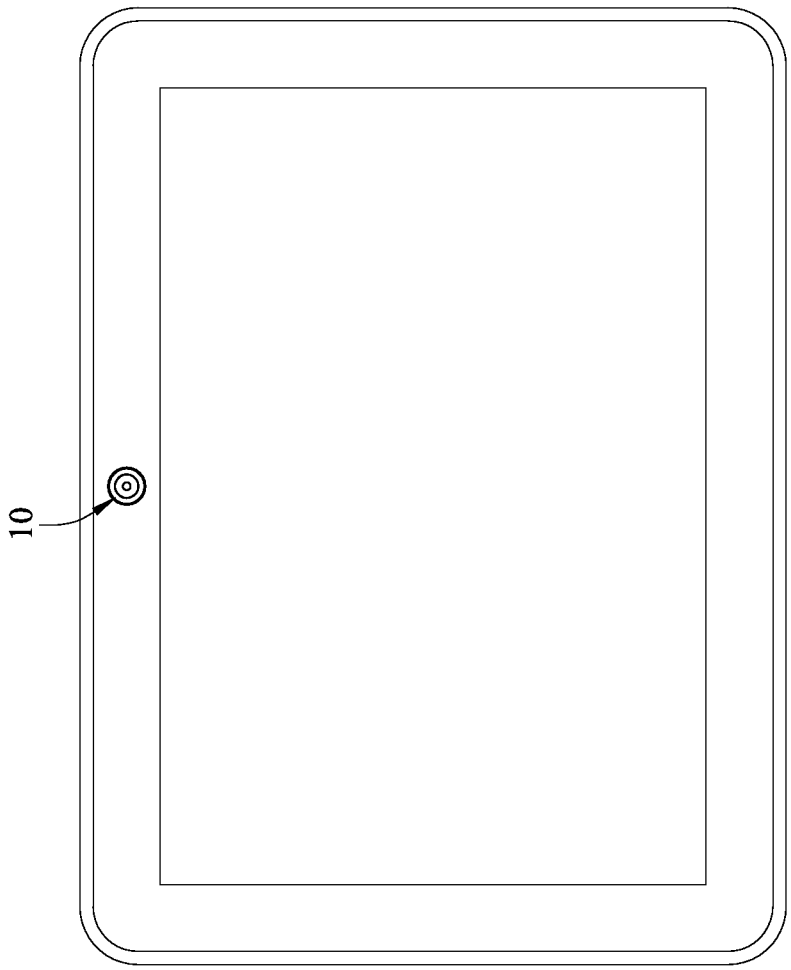
FIG. 19 shows an electronic device according to another embodiment.
Figure 18:
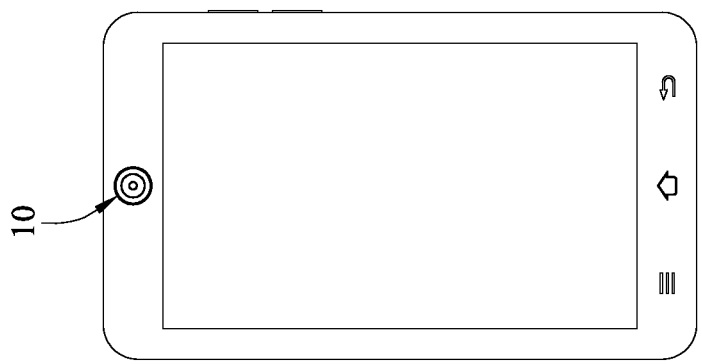
FIG. 18 shows an electronic device according to an embodiment.
Figure 20:
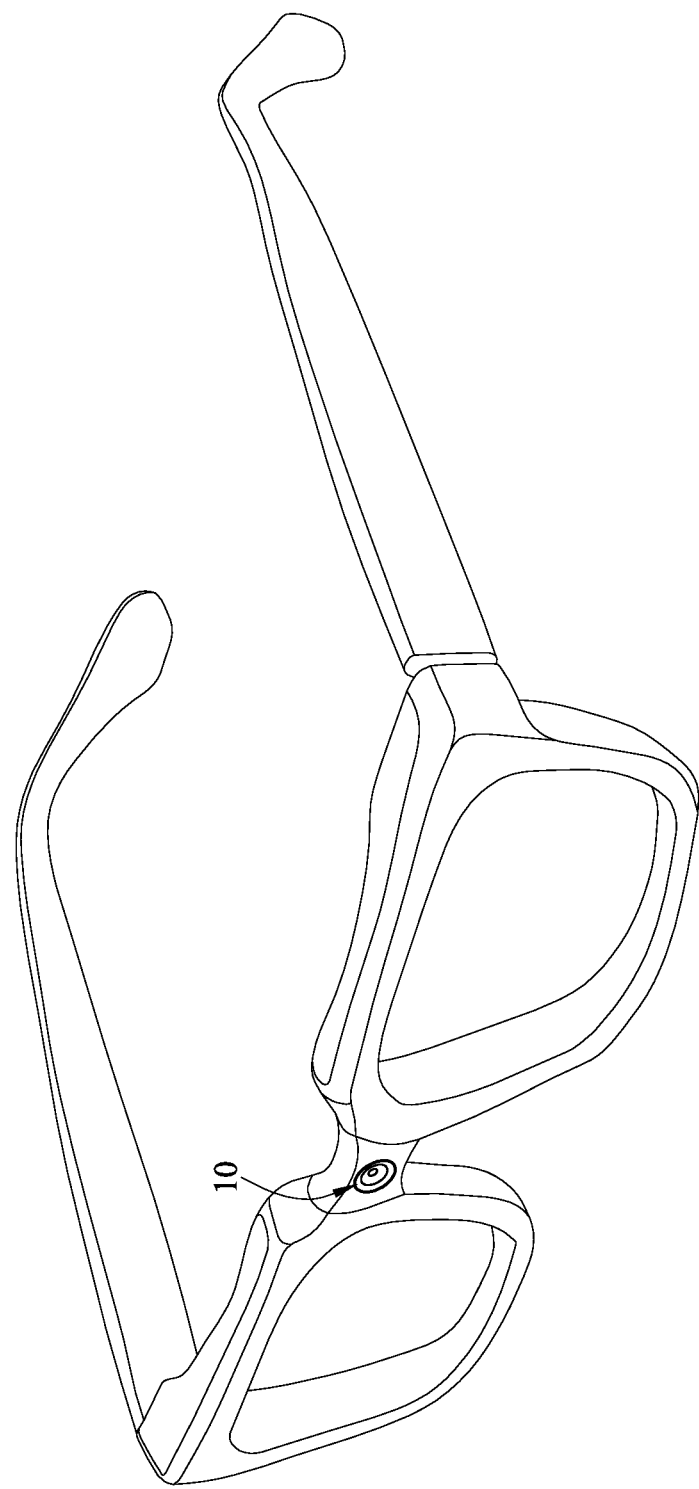
FIG. 20 shows an electronic device according to still another embodiment.

In FIG. 18, FIG. 19, and FIG. 20, an image capturing device 10 may be installed in, but not limited to, an electronic device, including a smart phone (FIG. 18), a tablet personal computer (FIG. 19) or a wearable device (FIG. 20). The electronic devices shown in the figures are only exemplary for showing the image capturing device of present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing system can be optionally applied to moving focus optical systems. Furthermore, the photographing system is featured with good capability in aberration corrections resulting high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
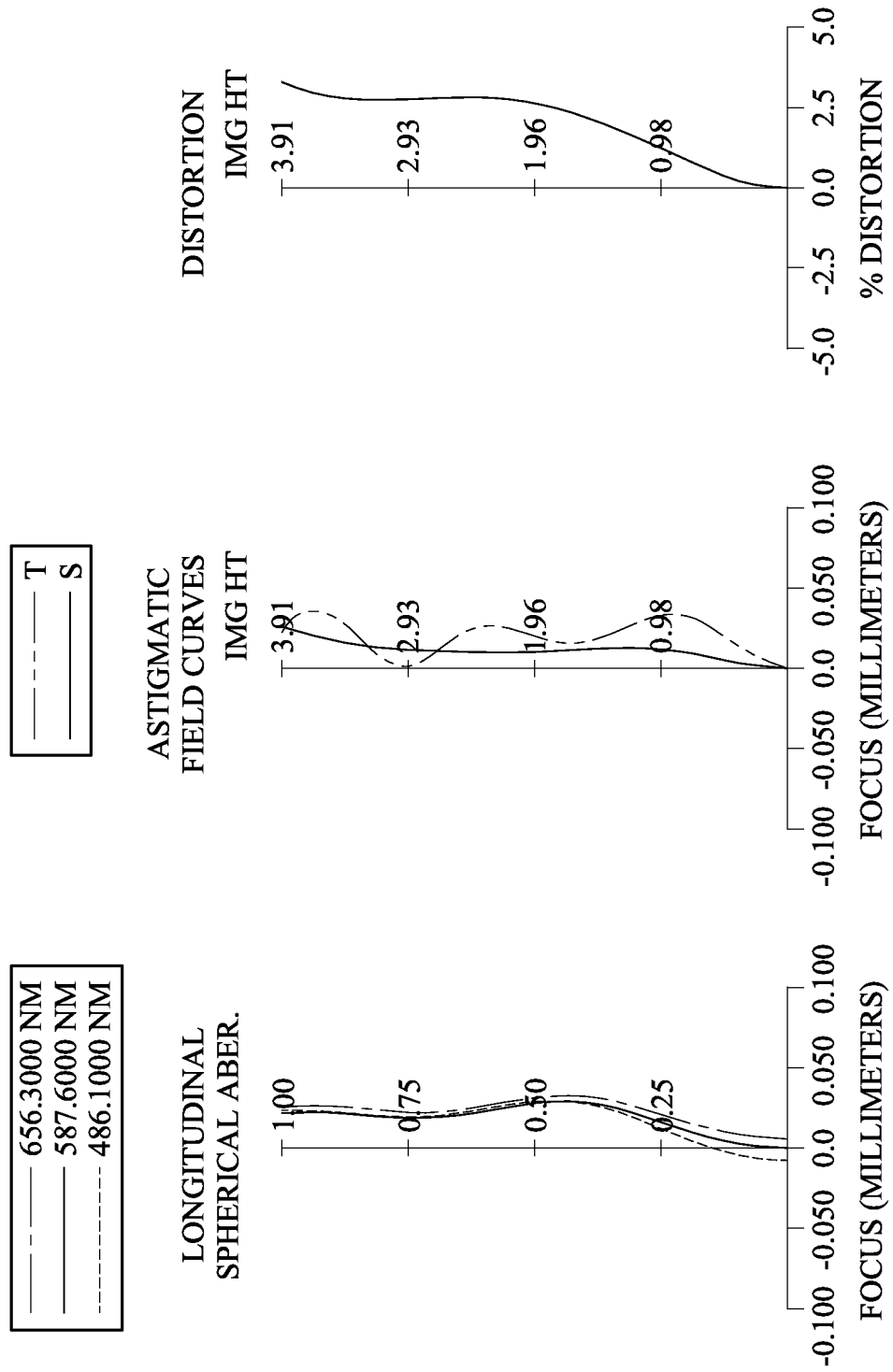
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing system (its reference numeral is omitted) of the present disclosure and an image sensor 195. The photographing system includes, in order from an object side to an image side, an aperture stop 100, a first lens element 110, a second lens element 120, a third lens element 130, a fourth lens element 140, a fifth lens element 150, a sixth lens element 160, a seventh lens element 170, an IR-cut filter 180 and an image surface 190, wherein the photographing system has a total of seven lens elements (110-170) with refractive power. The first lens element 110, the second lens element 120, the third lens element 130, the fourth lens element 140, the fifth lens element 150, the sixth lens element 160 and the seventh lens element 170 are all stationary relative to one another in a paraxial region thereof. There is an air gap in a paraxial region between every two of the first lens element 110, the second lens element 120, the third lens element 130, the fourth lens element 140, the fifth lens element 150, the sixth lens element 160 and the seventh lens element 170 that are adjacent to each other.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one concave shape in an off-axis region thereof. The image-side surface 162 of the sixth lens element 160 has at least one convex shape in an off-axis region thereof.

The seventh lens element 170 with negative refractive power has an object-side surface 171 being concave in a paraxial region thereof and an image-side surface 172 being concave in a paraxial region thereof. The seventh lens element 170 is made of plastic material and has the object-side surface 171 and the image-side surface 172 being both aspheric. The image-side surface 172 of the seventh lens element 170 has at least one convex shape in an off-axis region thereof.

The IR-cut filter 180 is made of glass and located between the seventh lens element 170 and the image surface 190, and will not affect the focal length of the photographing system. The image sensor 195 is disposed on or near the image surface 190 of the photographing system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing system of the image capturing unit according to the 1st embodiment, when a focal length of the photographing system in the paraxial region thereof is f, an f-number of the photographing system is Fno, and half of a maximal field of view of the photographing system is HFOV, these parameters have the following values: f=5.19 millimeters (mm); Fno=1.85; and HFOV=36.0 degrees.

When an Abbe number of the second lens element 120 is V2, the following condition is satisfied: V2=23.5.

When an Abbe number of the first lens element 110 is V1, the Abbe number of the second lens element 120 is V2, the following condition is satisfied: V1−V2=32.40.

When an axial distance between the object-side surface 111 of the first lens element 110 and the image-side surface 142 of the fourth lens element 140 is Dr1r8, an axial distance between the object-side surface 151 of the fifth lens element 150 and the image-side surface 172 of the seventh lens element 170 is Dr9r14, the following condition is satisfied: Dr1r8/Dr9r14=0.94.

When a sum of axial distances between every two lens elements adjacent to each other among the first lens element 110 through the seventh lens element 170 is ΣAT, an axial distance between the third lens element 130 and the fourth lens element 140 is T34, an axial distance between the fourth lens element 140 and the fifth lens element 150 is T45, the following condition is satisfied: ΣAT/(T34+T45)=6.17.

When the focal length of the photographing system is f, a curvature radius of the image-side surface 162 of the sixth lens element 160 is R12, a curvature radius of the object-side surface 171 of the seventh lens element 170 is R13, the following condition is satisfied: (f/R12)−(f/R13)=0.32.

When a focal length of the first lens element 110 is f1, a focal length of the second lens element 120 is f2, the following condition is satisfied: |f1/f2|=0.49.

When the focal length of the photographing system is f, a focal length of the third lens element 130 is f3, a focal length of the fourth lens element 140 is f4, a focal length of the fifth lens element 150 is f5, the following condition is satisfied: |f/f3|+|f/f4|+|f/f5|=1.16.

When the focal length of the photographing system is f, a composite focal length of the third lens element 130, the fourth lens element 140 and the fifth lens element 150 is f345, the following condition is satisfied: f/f345=0.20.

The detailed optical data of the 1st embodiment are shown in Table 1 and the aspheric surface data are shown in Table 2 below.

TABLE 1

1st Embodiment
f = 5.19 mm, Fno = 1.85, HFOV = 36.0 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.470 | | | | |
| 2 | Lens 1 | 2.350 | (ASP) | 0.704 | Plastic | 1.544 | 55.9 | 4.84 |
| 3 | | 19.630 | (ASP) | 0.056 | | | | |
| 4 | Lens 2 | 4.635 | (ASP) | 0.280 | Plastic | 1.639 | 23.5 | −9.80 |
| 5 | | 2.601 | (ASP) | 0.405 | | | | |
| 6 | Lens 3 | 5.782 | (ASP) | 0.325 | Plastic | 1.544 | 55.9 | −58.00 |
| 7 | | 4.790 | (ASP) | 0.207 | | | | |
| 8 | Lens 4 | 7.365 | (ASP) | 0.709 | Plastic | 1.544 | 55.9 | 7.61 |

TABLE 1-continued

1st Embodiment
f = 5.19 mm, Fno = 1.85, HFOV = 36.0 deg.

| Surface# | | Curvature Radius | | Thickness | Material | Index | Abbe # | Focal Length |
|---|---|---|---|---|---|---|---|---|
| 9 | | −9.130 | (ASP) | 0.095 | | | | |
| 10 | Lens 5 | −2.495 | (ASP) | 0.387 | Plastic | 1.639 | 23.5 | −13.50 |
| 11 | | −3.723 | (ASP) | 0.287 | | | | |
| 12 | Lens 6 | 3.351 | (ASP) | 0.631 | Plastic | 1.544 | 55.9 | 7.34 |
| 13 | | 19.398 | (ASP) | 0.814 | | | | |
| 14 | Lens 7 | −98.801 | (ASP) | 0.731 | Plastic | 1.535 | 55.7 | −4.56 |
| 15 | | 2.510 | (ASP) | 0.500 | | | | |
| 16 | IR-cut filter | Plano | | 0.210 | Glass | 1.517 | 64.2 | — |
| 17 | | Plano | | 0.240 | | | | |
| 18 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k= | 2.1296E−01 | −8.6527E+01 | −6.5133E+00 | −1.5120E+01 | −7.0244E+01 |
| A4= | 9.2646E−04 | −4.1334E−02 | −7.7191E−02 | 5.1947E−02 | −3.2861E−03 |
| A6= | −1.7176E−03 | 6.4590E−02 | 8.8016E−02 | −4.6694E−02 | −1.5821E−02 |
| A8= | 3.9088E−03 | −5.3306E−02 | −6.0224E−02 | 5.6103E−02 | 6.5798E−03 |
| A10= | −4.1754E−03 | 2.6270E−02 | 2.7049E−02 | −3.6019E−02 | −1.2907E−03 |
| A12= | 2.1577E−03 | −6.5197E−03 | −6.3011E−03 | 1.3389E−02 | 1.2607E−04 |
| A14= | −4.1047E−04 | 5.0076E−04 | 3.7876E−04 | −2.0674E−03 | −1.4031E−04 |

| Surface # | 7 | 8 | 9 | 10 | 11 |
|---|---|---|---|---|---|
| k= | −4.1559E+01 | −9.0000E+01 | 2.4944E+01 | −1.0062E+00 | −2.2648E+01 |
| A4= | −2.5121E−02 | −3.7711E−02 | −6.5636E−02 | 5.8191E−03 | −5.5709E−02 |
| A6= | −4.7742E−03 | −6.1624E−03 | 3.0189E−02 | 5.3471E−02 | 6.0609E−02 |
| A8= | 7.7914E−04 | −1.5145E−03 | −1.2640E−02 | −5.3689E−02 | −3.7827E−02 |
| A10= | 2.5432E−04 | 4.3097E−04 | −8.6636E−03 | 2.6423E−02 | 1.4415E−02 |
| A12= | −2.2216E−04 | 3.5475E−04 | 1.1088E−02 | −6.4021E−03 | −2.9679E−03 |
| A14= | — | — | −4.1288E−03 | 5.4119E−04 | 2.4471E−04 |
| A16= | — | — | 5.2570E−04 | — | — |

| Surface # | 12 | 13 | 14 | 15 |
|---|---|---|---|---|
| k= | −1.4368E+01 | 2.1011E+01 | −9.0000E+01 | −3.4442E+00 |
| A4= | −1.7418E−03 | 1.3035E−03 | −8.9813E−02 | −6.6083E−02 |
| A6= | −7.4522E−03 | −8.6064E−03 | 8.9513E−03 | 1.9131E−02 |
| A8= | 9.9732E−04 | 2.6197E−03 | 5.5542E−03 | −3.9911E−03 |
| A10= | −9.6787E−04 | −1.2475E−03 | −3.0335E−03 | 5.3163E−04 |
| A12= | 3.6010E−04 | 3.0127E−04 | 5.9841E−04 | −4.3138E−05 |
| A14= | −4.0204E−05 | −2.3092E−05 | −4.2052E−05 | 1.9337E−06 |
| A16= | — | — | 2.7771E−07 | −3.6970E−08 |

In Table 1, the curvature radius, the thickness and the focal length are shown in millimeters (mm). Surface numbers 0-18 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
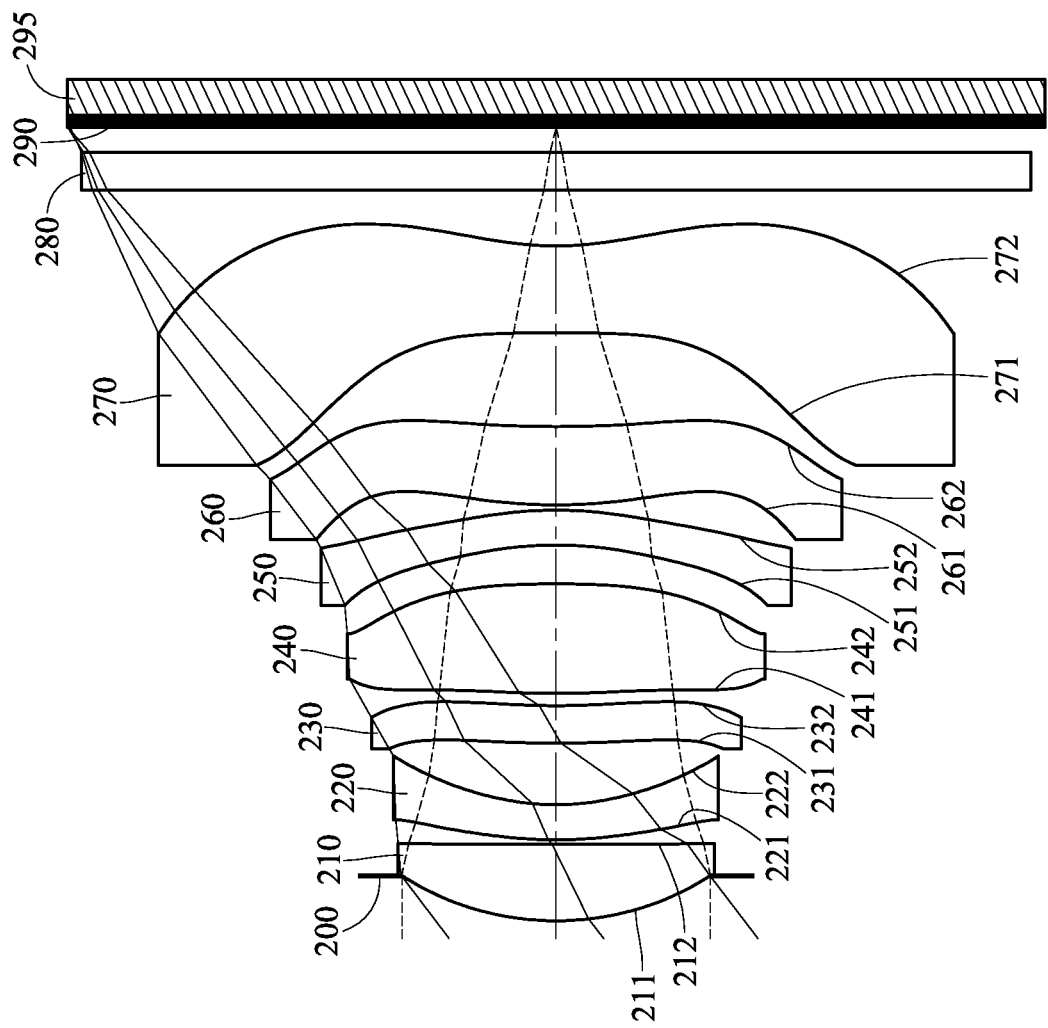
FIG. 3 is a schematic view of an image capturing unit according to the 2nd embodiment of the present disclosure.
Figure 4:
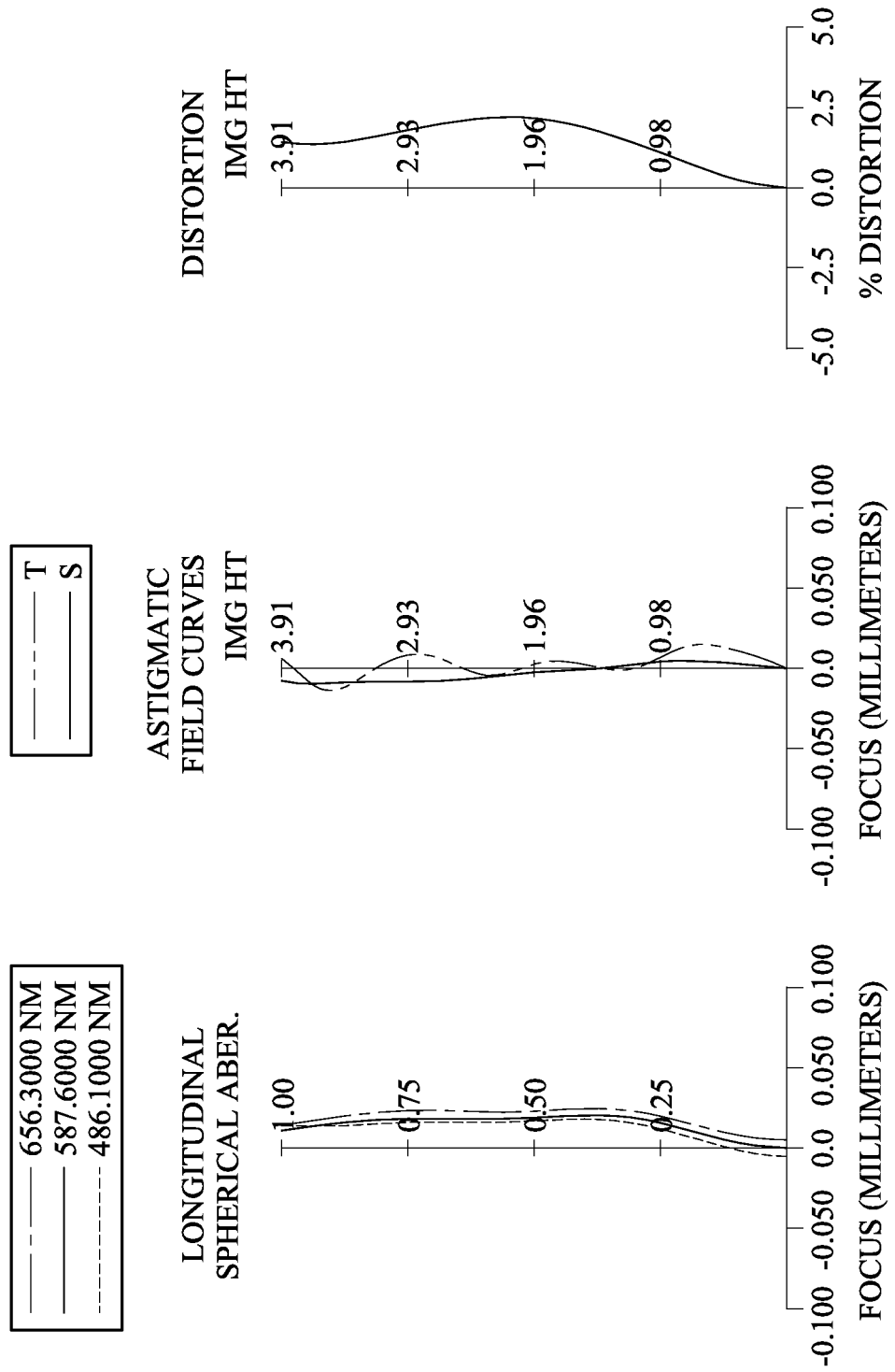
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing system (its reference numeral is omitted) of the present disclosure and an image sensor 295. The photographing system includes, in order from an object side to an image side an aperture stop 200, a first lens element 210, a second lens element 220, a third lens element 230, a fourth lens element 240, a fifth lens element 250, a sixth lens element 260, a seventh lens element 270, an IR-cut filter 280 and an image surface 290, wherein the photographing system has a total of seven lens elements (210-270) with refractive power. The first lens element 210, the second lens element 220, the third lens element 230, the fourth lens element 240, the fifth lens element 250, the sixth lens element 260 and the seventh lens element 270 are all stationary relative to one another in a paraxial region thereof. There is an air gap in a paraxial region between every two of the first lens element 210, the second lens element 220, the third lens element 230, the fourth lens element 240, the fifth lens element 250, the sixth lens element 260 and the seventh lens element 270 that are adjacent to each other.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has at least one concave shape in an off-axis region thereof. The image-side surface 262 of the sixth lens element 260 has at least one convex shape in an off-axis region thereof.

The seventh lens element 270 with negative refractive power has an object-side surface 271 being concave in a paraxial region thereof and an image-side surface 272 being concave in a paraxial region thereof. The seventh lens element 270 is made of plastic material and has the object-side surface 271 and the image-side surface 272 being both aspheric. The image-side surface 272 of the seventh lens element 270 has at least one convex shape in an off-axis region thereof.

The IR-cut filter 280 is made of glass and located between the seventh lens element 270 and the image surface 290, and will not affect the focal length of the photographing system. The image sensor 295 is disposed on or near the image surface 290 of the photographing system.

The detailed optical data of the 2nd embodiment are shown in Table 3 and the aspheric surface data are shown in Table 4 below.

TABLE 3

2nd Embodiment
f = 5.06 mm, Fno = 2.05, HFOV = 37.2 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.357 | | | | |
| 2 | Lens 1 | 2.330 | (ASP) | 0.614 | Plastic | 1.530 | 55.8 | 4.31 |
| 3 | | −99.868 | (ASP) | 0.035 | | | | |
| 4 | Lens 2 | 3.455 | (ASP) | 0.280 | Plastic | 1.645 | 22.5 | −7.88 |
| 5 | | 1.991 | (ASP) | 0.494 | | | | |
| 6 | Lens 3 | 8.603 | (ASP) | 0.300 | Plastic | 1.645 | 22.5 | −34.31 |
| 7 | | 6.109 | (ASP) | 0.100 | | | | |
| 8 | Lens 4 | 8.095 | (ASP) | 0.876 | Plastic | 1.544 | 55.9 | 8.12 |
| 9 | | −9.349 | (ASP) | 0.311 | | | | |
| 10 | Lens 5 | −3.155 | (ASP) | 0.280 | Plastic | 1.645 | 22.5 | 162.29 |
| 11 | | −3.169 | (ASP) | 0.043 | | | | |
| 12 | Lens 6 | 4.675 | (ASP) | 0.626 | Plastic | 1.544 | 55.9 | 14.65 |
| 13 | | 10.771 | (ASP) | 0.750 | | | | |
| 14 | Lens 7 | −98.801 | (ASP) | 0.698 | Plastic | 1.544 | 55.9 | −4.50 |
| 15 | | 2.515 | (ASP) | 0.450 | | | | |
| 16 | IR-cut filter | Plano | | 0.300 | Glass | 1.517 | 64.2 | — |
| 17 | | Plano | | 0.200 | | | | |
| 18 | Image | Plano | | — | | | | |

Note:
Reference wavelength is 587.6 nm (d-line).

TABLE 4

Aspheric Coefficients

| Surface # | 2 | 3 | 4 | 5 | 6 |
|---|---|---|---|---|---|
| k= | 2.3037E−01 | 4.0000E+01 | −1.8898E+00 | −6.3424E+00 | −9.0000E+01 |
| A4= | 5.6921E−05 | −1.0429E−02 | −6.9298E−02 | 2.9701E−02 | −1.1492E−02 |
| A6= | 4.8418E−04 | 4.9295E−02 | 9.2487E−02 | −3.1419E−03 | −1.2996E−02 |

TABLE 4-continued

| Aspheric Coefficients | | | | | |
|---|---|---|---|---|---|
| A8= | 6.6822E-04 | -5.4086E-02 | -8.6006E-02 | 1.3646E-02 | 2.7319E-03 |
| A10= | -3.4212E-03 | 2.9751E-02 | 4.9885E-02 | -1.4922E-02 | -6.5651E-04 |
| A12= | 3.7758E-03 | -7.2292E-03 | -1.6830E-02 | 7.2981E-03 | -1.2768E-03 |
| A14= | -1.2641E-03 | 4.8057E-06 | 2.1011E-03 | -1.4579E-03 | 2.8886E-04 |

| Surface # | 7 | 8 | 9 | 10 | 11 |
|---|---|---|---|---|---|
| k= | -4.3634E+01 | -9.0000E+01 | 1.4539E+01 | 5.3180E-01 | -1.5614E+01 |
| A4= | -2.9931E-02 | -2.5050E-02 | -6.7774E-02 | -4.5438E-02 | -3.7227E-02 |
| A6= | -6.1899E-03 | 1.0299E-03 | 3.4035E-02 | 1.6434E-01 | 8.6236E-02 |
| A8= | -1.6139E-03 | -3.6814E-04 | -1.2092E-02 | -1.5430E-01 | -6.8550E-02 |
| A10= | 1.0947E-03 | 2.3267E-03 | -9.0795E-03 | 6.9007E-02 | 2.5335E-02 |
| A12= | -2.5820E-04 | -3.8122E-04 | 1.0919E-02 | -1.5404E-02 | -4.4538E-03 |
| A14= | — | — | -4.0510E-03 | 1.3508E-03 | 3.0174E-04 |
| A16= | — | — | 5.4744E-04 | — | — |

| Surface # | 12 | 13 | 14 | 15 |
|---|---|---|---|---|
| k= | 6.8937E-01 | 1.7110E+01 | -9.0000E+01 | -2.9948E+00 |
| A4= | 3.7883E-02 | 3.0918E-02 | -7.6728E-02 | -6.9917E-02 |
| A6= | -8.9295E-02 | -5.0912E-02 | 1.7296E-03 | 1.9180E-02 |
| A8= | 5.1711E-02 | 2.1952E-02 | 5.5386E-03 | -4.1010E-03 |
| A10= | -1.8510E-02 | -5.9551E-03 | -2.5601E-03 | 5.8622E-04 |
| A12= | 3.4161E-03 | 8.7926E-04 | 6.1264E-04 | -5.1745E-05 |
| A14= | -2.4545E-04 | -5.0842E-05 | -6.9372E-05 | 2.5142E-06 |
| A16= | — | — | 2.9195E-06 | -5.1815E-08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.06 | $\Sigma AT/(T34 + T45)$ | 4.22 |
| Fno | 2.05 | $(f/R12) - (f/R13)$ | 0.52 |
| HFOV [deg.] | 37.02 | $|f1/f2|$ | 0.55 |
| V2 | 22.5 | $|f/f3| + |f/f4| + |f/f5|$ | 0.80 |
| V1 - V2 | 33.30 | $f/f345$ | 0.49 |
| Dr1r8/Dr9r14 | 1.13 | | |

3rd Embodiment

Figure 5:
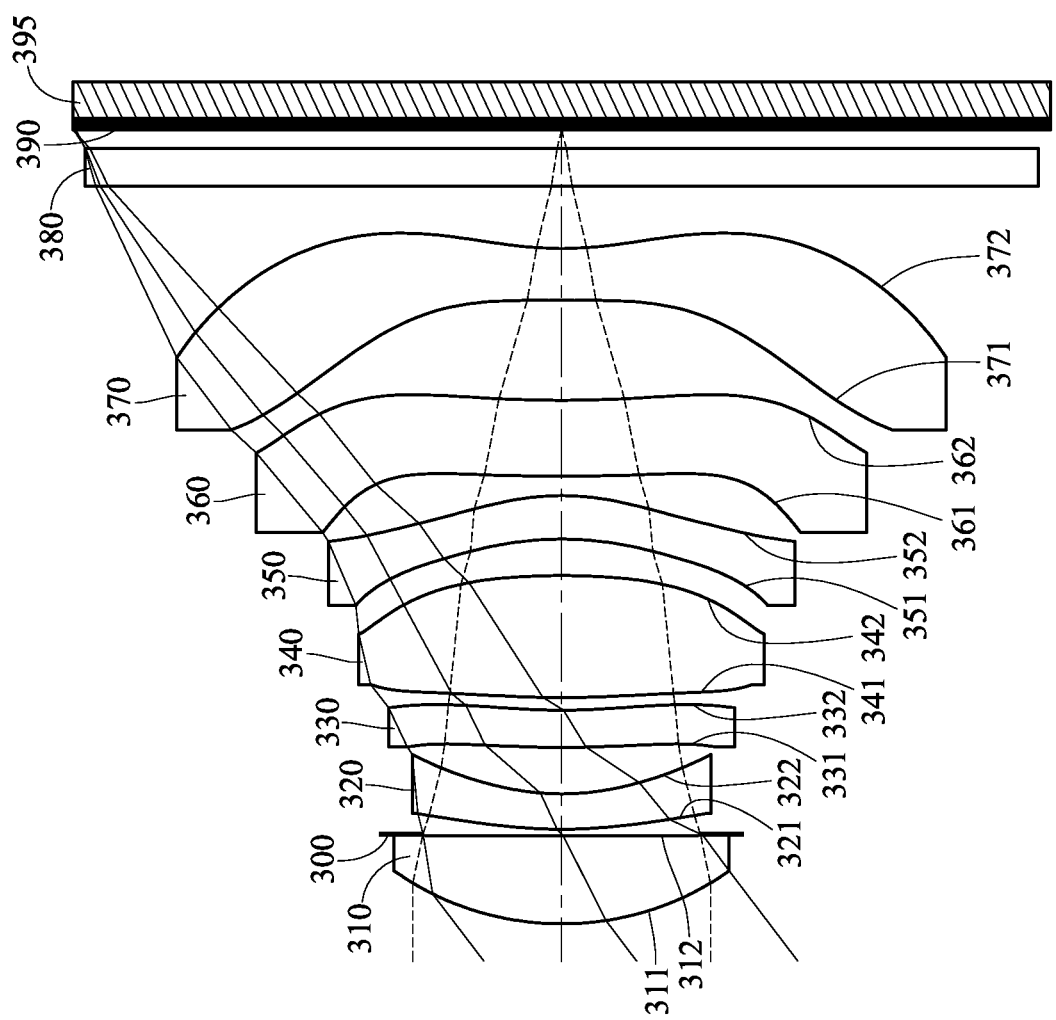
FIG. 5 is a schematic view of an image capturing unit according to the 3rd embodiment of the present disclosure.
Figure 6:
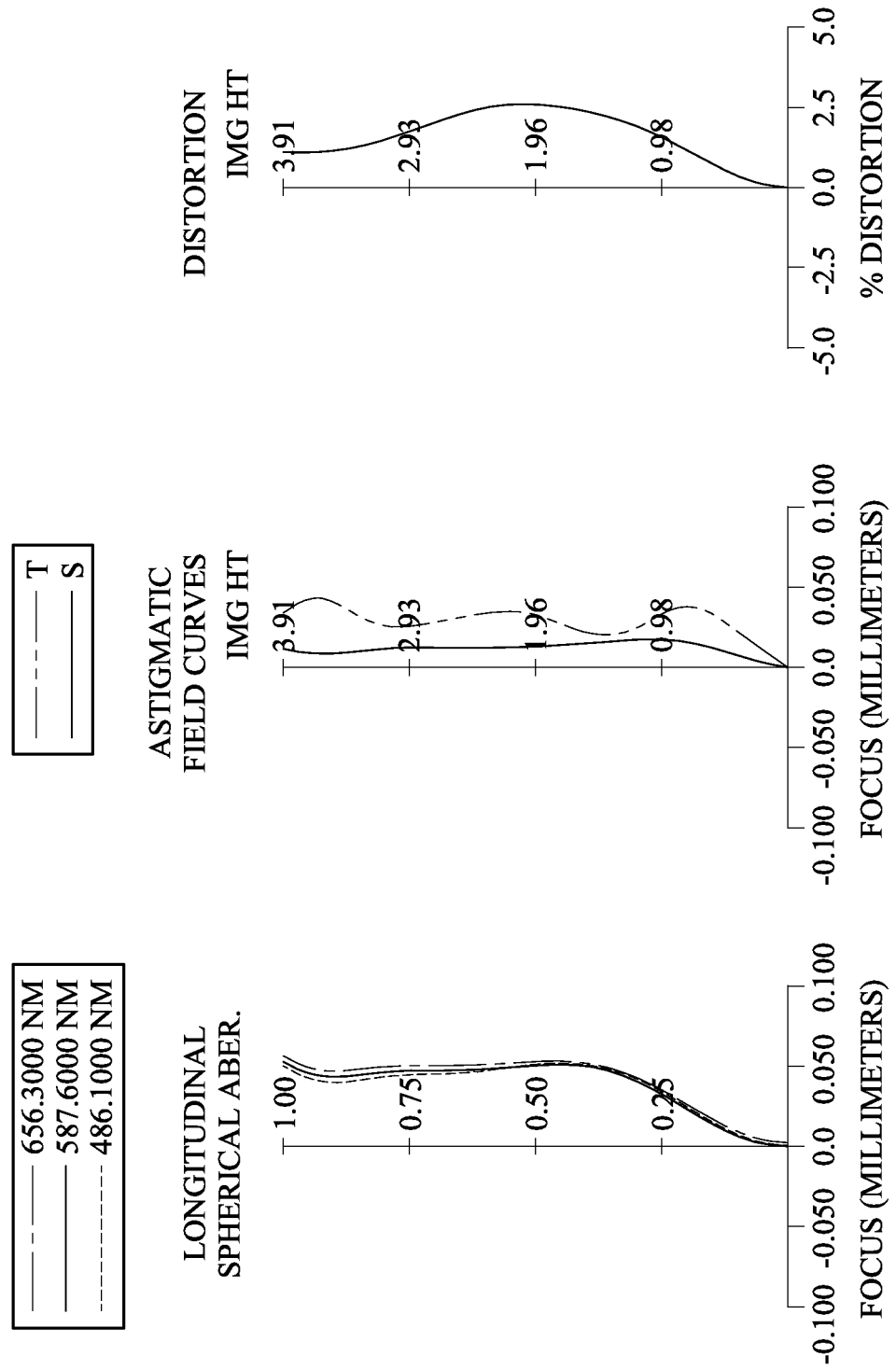
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing system (its reference numeral is omitted) of the present disclosure and an image sensor 395. The photographing system includes, in order from an object side to an image side, a first lens element 310, an aperture stop 300, a second lens element 320, a third lens element 330, a fourth lens element 340, a fifth lens element 350, a sixth lens element 360, a seventh lens element 370, an IR-cut filter 380 and an image surface 390, wherein the photographing system has a total of seven lens elements (310-370) with refractive power. The first lens element 310, the second lens element 320, the third lens element 330, the fourth lens element 340, the fifth lens element 350, the sixth lens element 360 and the seventh lens element 370 are all stationary relative to one another in a paraxial region thereof. There is an air gap in a paraxial region between every two of the first lens element 310, the second lens element 320, the third lens element 330, the fourth lens element 340, the fifth lens element 350, the sixth lens element 360 and the seventh lens element 370 that are adjacent to each other.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one concave shape in an off-axis region thereof. The image-side surface 362 of the sixth lens element 360 has at least one convex shape in an off-axis region thereof.

The seventh lens element 370 with negative refractive power has an object-side surface 371 being concave in a paraxial region thereof and an image-side surface 372 being concave in a paraxial region thereof. The seventh lens element 370 is made of plastic material and has the object-side surface 371 and the image-side surface 372 being both aspheric. The image-side surface 372 of the seventh lens element 370 has at least one convex shape in an off-axis region thereof.

The IR-cut filter 380 is made of glass and located between the seventh lens element 370 and the image surface 390, and will not affect the focal length of the photographing system. The image sensor 395 is disposed on or near the image surface 390 of the photographing system.

The detailed optical data of the 3rd embodiment are shown in Table 5 and the aspheric surface data are shown in Table 6 below.

TABLE 5

3rd Embodiment
f = 5.05 mm, Fno = 2.12, HFOV = 37.2 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.363 | (ASP) | 0.708 | Plastic | 1.544 | 55.9 | 4.27 |
| 2 | | −117.394 | (ASP) | 0.012 | | | | |
| 3 | Ape. Stop | Plano | | 0.038 | | | | |
| 4 | Lens 2 | 3.623 | (ASP) | 0.284 | Plastic | 1.640 | 23.3 | −7.39 |
| 5 | | 1.988 | (ASP) | 0.372 | | | | |
| 6 | Lens 3 | 7.772 | (ASP) | 0.300 | Plastic | 1.640 | 23.3 | −25.16 |
| 7 | | 5.162 | (ASP) | 0.100 | | | | |
| 8 | Lens 4 | 6.938 | (ASP) | 0.979 | Plastic | 1.544 | 55.9 | 6.45 |
| 9 | | −6.758 | (ASP) | 0.292 | | | | |
| 10 | Lens 5 | −2.872 | (ASP) | 0.350 | Plastic | 1.544 | 55.9 | 10.72 |
| 11 | | −2.007 | (ASP) | 0.157 | | | | |
| 12 | Lens 6 | 32.019 | (ASP) | 0.608 | Plastic | 1.640 | 23.3 | −23.17 |
| 13 | | 10.057 | (ASP) | 0.802 | | | | |
| 14 | Lens 7 | −82.431 | (ASP) | 0.415 | Plastic | 1.544 | 55.9 | −4.81 |
| 15 | | 2.708 | (ASP) | 0.500 | | | | |
| 16 | IR-cut filter | Plano | | 0.300 | Glass | 1.517 | 64.2 | — |
| 17 | | Plano | | 0.149 | | | | |
| 18 | Image | Plano | | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k= | 1.8639E−01 | −9.0000E+01 | −2.8786E+00 | −6.3812E+00 | −9.0000E+01 |
| A4= | −1.4547E−03 | −1.4382E−02 | −7.6780E−02 | 2.7581E−02 | −1.1032E−02 |
| A6= | 1.6567E−03 | 4.8845E−02 | 1.0913E−01 | −7.9756E−03 | −1.1221E−02 |
| A8= | 8.0908E−04 | −5.3153E−02 | −1.2654E−01 | 1.3489E−02 | 1.5115E−03 |
| A10= | −3.8861E−03 | 2.9707E−02 | 9.6527E−02 | −1.3756E−02 | −1.0351E−03 |
| A12= | 3.2553E−03 | −7.4228E−03 | −4.1316E−02 | 8.2174E−03 | −1.2075E−03 |
| A14= | −8.7053E−04 | 2.1968E−04 | 7.0858E−03 | −2.1297E−03 | 7.4240E−04 |

| Surface # | 7 | 8 | 9 | 10 | 11 |
|---|---|---|---|---|---|
| k= | −4.3704E+01 | −9.0000E+01 | 1.2045E+01 | 6.5326E−01 | −9.7812E+00 |
| A4= | −2.5343E−02 | −1.7664E−02 | −5.9060E−02 | −6.5669E−02 | −8.0528E−02 |
| A6= | −3.2159E−03 | 1.6171E−03 | 3.2915E−02 | 1.7126E−01 | 1.4507E−01 |
| A8= | −1.3030E−03 | −4.0991E−04 | −1.2662E−02 | −1.3986E−01 | −1.0321E−01 |
| A10= | 1.0979E−03 | 2.3042E−03 | −9.2391E−03 | 5.5561E−02 | 3.7232E−02 |
| A12= | 2.1290E−05 | −4.2535E−04 | 1.0898E−02 | −1.0919E−02 | −6.6608E−03 |
| A14= | — | — | −4.0396E−03 | 7.9904E−04 | 4.6905E−04 |
| A16= | — | — | 5.5861E−04 | — | — |

TABLE 6-continued

Aspheric Coefficients

| Surface # | 12 | 13 | 14 | 15 |
|---|---|---|---|---|
| k= | −8.9856E+01 | 1.3514E+01 | −9.0000E+01 | −5.8292E+00 |
| A4= | 4.2157E−02 | 1.2362E−03 | −9.3623E−02 | −6.7610E−02 |
| A6= | −5.4070E−02 | −1.7853E−02 | 1.7505E−02 | 1.7722E−02 |
| A8= | 2.0695E−02 | 6.0974E−03 | −7.6279E−05 | −3.4673E−03 |
| A10= | −5.2610E−03 | −1.2973E−03 | −5.3932E−04 | 4.3256E−04 |
| A12= | 5.2700E−04 | 1.5242E−04 | 1.1175E−04 | −3.2327E−05 |
| A14= | 6.4357E−06 | −7.0517E−06 | −1.0204E−05 | 1.3064E−06 |
| A16= | — | — | 3.6269E−07 | −2.2701E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.05 | ΣAT/(T34 + T45) | 4.52 |
| Fno | 2.12 | (f/R12) − (f/R13) | 0.56 |
| HFOV [deg.] | 37.2 | \|f1/f2\| | 0.58 |
| V2 | 23.3 | \|f/f3\| + \|f/f4\| + \|f/f5\| | 1.45 |
| V1 − V2 | 32.60 | f/f345 | 0.99 |
| Dr1r8/Dr9r14 | 1.20 | | |

4th Embodiment

Figure 7:
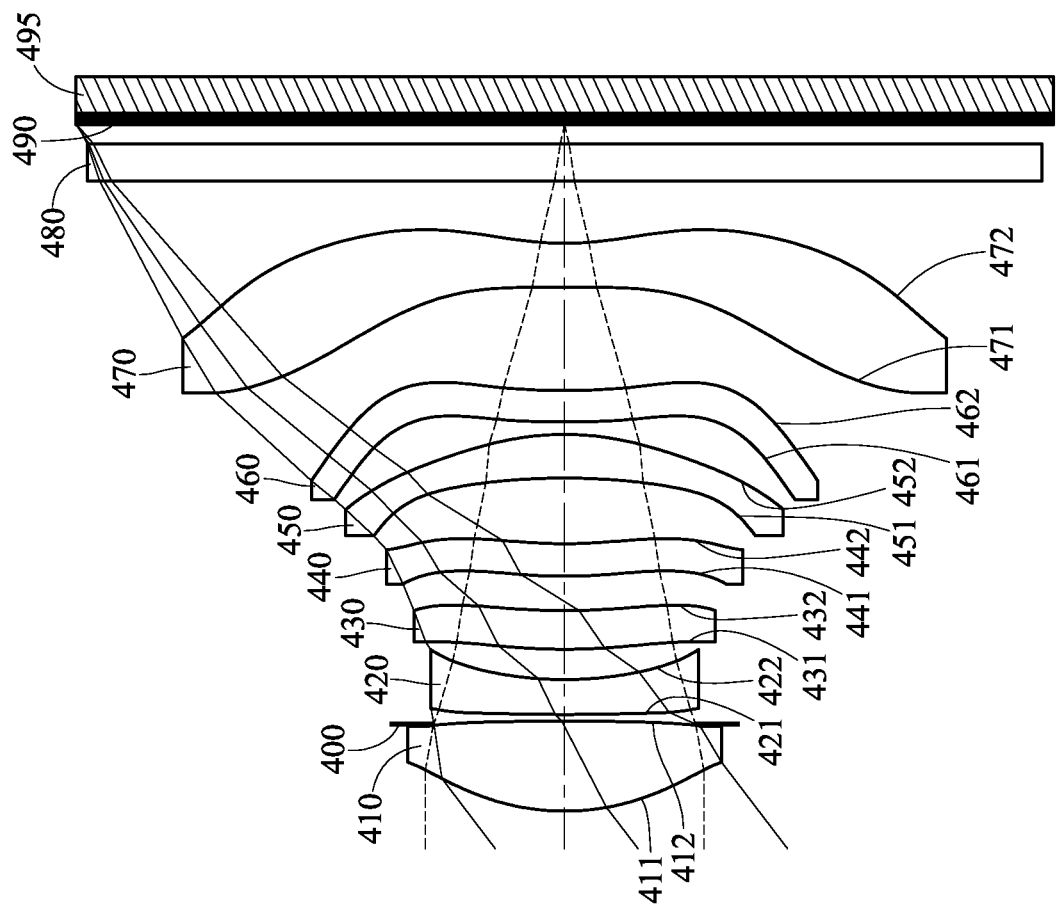
FIG. 7 is a schematic view of an image capturing unit according to the 4th embodiment of the present disclosure.
Figure 8:
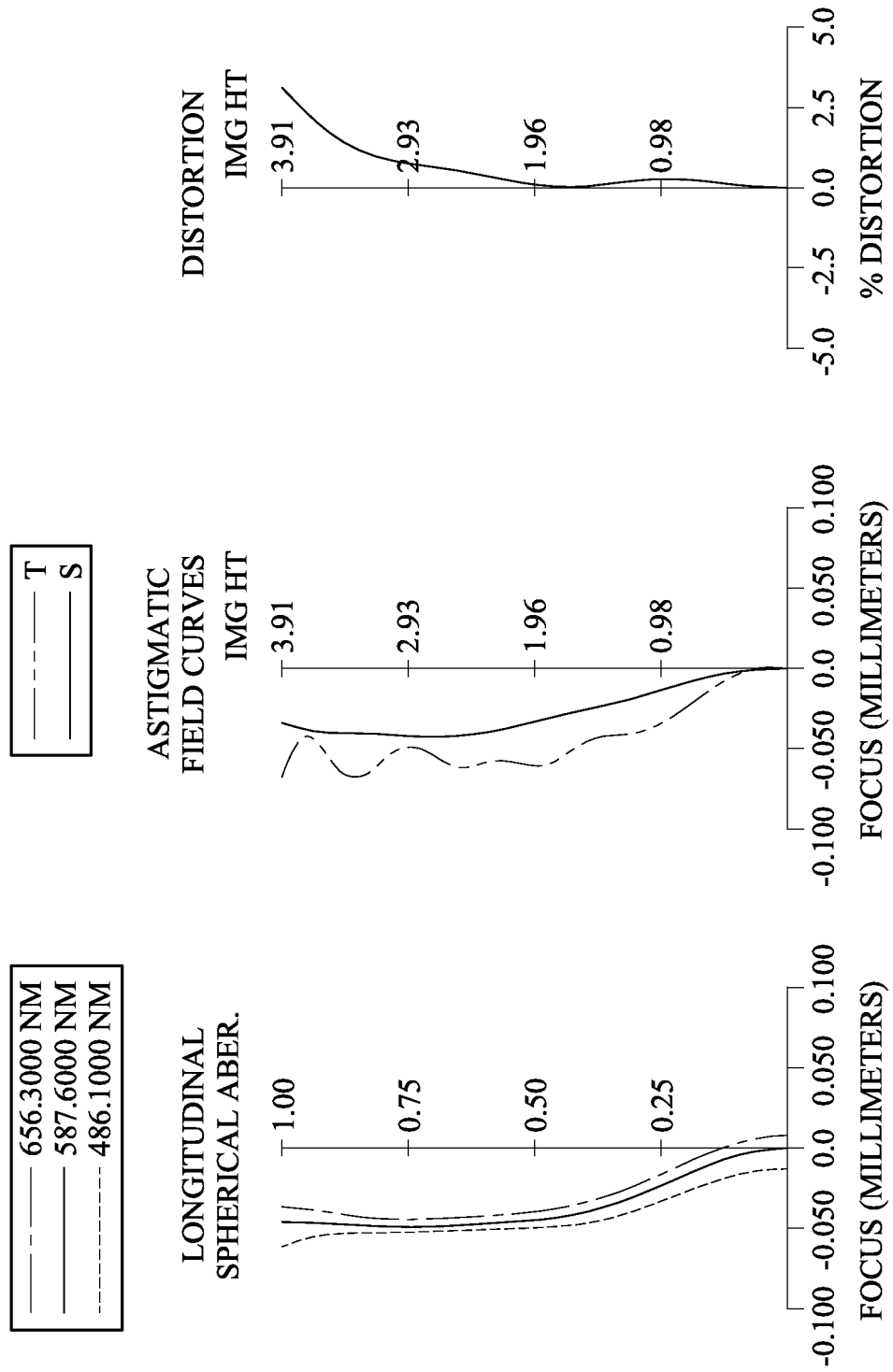
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing system (its reference numeral is omitted) of the present disclosure and an image sensor 495. The photographing system includes, in order from an object side to an image side, a first lens element 410, an aperture stop 400, a second lens element 420, a third lens element 430, a fourth lens element 440, a fifth lens element 450, a sixth lens element 460, a seventh lens element 470, an IR-cut filter 480 and an image surface 490, wherein the photographing system has a total of seven lens elements (410-470) with refractive power. The first lens element 410, the second lens element 420, the third lens element 430, the fourth lens element 440, the fifth lens element 450, the sixth lens element 460 and the seventh lens element 470 are all stationary relative to one another in a paraxial region thereof. There is an air gap in a paraxial region between every two of the first lens element 410, the second lens element 420, the third lens element 430, the fourth lens element 440, the fifth lens element 450, the sixth lens element 460 and the seventh lens element 470 that are adjacent to each other.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has at least one concave shape in an off-axis region thereof. The image-side surface 462 of the sixth lens element 460 has at least one convex shape in an off-axis region thereof.

The seventh lens element 470 with negative refractive power has an object-side surface 471 being concave in a paraxial region thereof and an image-side surface 472 being concave in a paraxial region thereof. The seventh lens element 470 is made of plastic material and has the object-side surface 471 and the image-side surface 472 being both aspheric.

The IR-cut filter 480 is made of glass and located between the seventh lens element 470 and the image surface 490, and will not affect the focal length of the photographing system. The image sensor 495 is disposed on or near the image surface 490 of the photographing system.

The detailed optical data of the 4th embodiment are shown in Table 7 and the aspheric surface data are shown in Table 8 below.

TABLE 7

4th Embodiment
f = 5.01 mm, Fno = 2.25, HFOV = 37.3 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.902 | (ASP) | 0.720 | Plastic | 1.544 | 55.9 | 3.48 |
| 2 | | −494.868 | (ASP) | −0.021 | | | | |
| 3 | Ape. Stop | Plano | | 0.075 | | | | |
| 4 | Lens 2 | 14.834 | (ASP) | 0.280 | Plastic | 1.639 | 23.5 | −5.71 |
| 5 | | 2.907 | (ASP) | 0.243 | | | | |
| 6 | Lens 3 | 4.761 | (ASP) | 0.310 | Plastic | 1.544 | 55.9 | 122.46 |
| 7 | | 5.009 | (ASP) | 0.275 | | | | |
| 8 | Lens 4 | 3.535 | (ASP) | 0.261 | Plastic | 1.639 | 23.5 | 64.24 |
| 9 | | 3.757 | (ASP) | 0.527 | | | | |
| 10 | Lens 5 | −5.784 | (ASP) | 0.350 | Plastic | 1.544 | 55.9 | 6.11 |
| 11 | | −2.155 | (ASP) | 0.100 | | | | |
| 12 | Lens 6 | 10.815 | (ASP) | 0.252 | Plastic | 1.544 | 55.9 | −50.15 |
| 13 | | 7.682 | (ASP) | 0.828 | | | | |
| 14 | Lens 7 | −123.133 | (ASP) | 0.350 | Plastic | 1.535 | 55.7 | −4.05 |
| 15 | | 2.208 | (ASP) | 0.500 | | | | |
| 16 | IR-cut filter | Plano | | 0.300 | Glass | 1.517 | 64.2 | — |
| 17 | | Plano | | 0.149 | | | | |
| 18 | Image | Plano | | — | | | | |

Note:
Reference wavelength is 587.6 nm (d-line).

TABLE 8

Aspheric Coefficients

| Surface # | 1 | 2 | 4 | 5 | 6 |
|---|---|---|---|---|---|
| k= | 2.8365E−02 | 4.0000E+01 | 7.4888E+01 | −5.4258E+00 | −9.0008E+00 |
| A4= | −1.9682E−03 | −4.9986E−02 | −5.3683E−02 | 1.3309E−02 | −1.3494E−02 |
| A6= | −1.2153E−02 | 5.6258E−02 | 6.9567E−02 | 2.1902E−02 | −2.6631E−02 |
| A8= | 6.2481E−03 | −5.1966E−02 | −1.6440E−02 | 2.8009E−03 | −4.8479E−03 |
| A10= | −6.2637E−03 | 2.6345E−02 | −1.4315E−02 | −1.7157E−03 | 1.8765E−03 |
| A12= | −1.1261E−03 | −7.7454E−03 | 2.1868E−02 | 1.2151E−02 | 1.3261E−03 |
| A14= | 3.5097E−04 | 6.1149E−04 | −7.4544E−03 | −5.0219E−03 | 2.8638E−03 |

| Surface # | 7 | 8 | 9 | 10 | 11 |
|---|---|---|---|---|---|
| k= | −5.8696E+01 | −2.1720E+01 | −1.4572E+01 | 9.4370E+00 | −2.6024E+00 |
| A4= | −7.2549E−04 | −8.0618E−02 | −9.2390E−02 | −3.8094E−02 | 1.9803E−02 |
| A6= | −1.6367E−02 | 8.2741E−03 | 2.2205E−02 | 7.6432E−02 | −2.7741E−02 |
| A8= | −1.6498E−02 | −2.0263E−03 | −7.7960E−03 | −6.1773E−02 | 4.1832E−02 |
| A10= | 1.5069E−03 | −7.2685E−04 | −8.4503E−03 | 1.8679E−02 | −2.9417E−02 |
| A12= | 2.3710E−03 | −4.6111E−04 | 1.1072E−02 | −4.1448E−03 | 8.7920E−03 |
| A14= | — | — | −4.0035E−03 | 6.5218E−04 | −9.5600E−04 |
| A16= | — | — | 5.7635E−04 | — | — |

| Surface # | 12 | 13 | 14 | 15 |
|---|---|---|---|---|
| k= | 6.5450E+00 | 1.2271E+01 | −1.0000E+00 | −9.3112E+00 |
| A4= | 1.5459E−01 | 1.3670E−01 | −1.1234E−01 | −8.2655E−02 |
| A6= | −2.7727E−01 | −2.4390E−01 | 3.0671E−02 | 2.1042E−02 |
| A8= | 1.6853E−01 | 1.4238E−01 | −3.3143E−03 | −2.7320E−03 |
| A10= | −5.9824E−02 | −4.7479E−02 | 4.5884E−06 | 1.6236E−04 |
| A12= | 1.1264E−02 | 8.3325E−03 | 3.7912E−05 | −6.6474E−06 |
| A14= | −8.4119E−04 | −5.8689E−04 | −3.7642E−06 | 6.2516E−07 |
| A16= | — | — | 1.2206E−07 | −2.9975E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.01 | ΣAT/(T34 + T45) | 2.53 |
| Fno | 2.25 | (f/R12) − (f/R13) | 0.69 |
| HFOV [deg.] | 37.3 | \|f1/f2\| | 0.61 |
| V2 | 23.5 | \|f/f3\| + \|f/f4\| + \|f/f5\| | 0.94 |
| V1 − V2 | 32.40 | f/f345 | 0.88 |
| Dr1r8/Dr9r14 | 1.14 | | |

5th Embodiment

Figure 9:
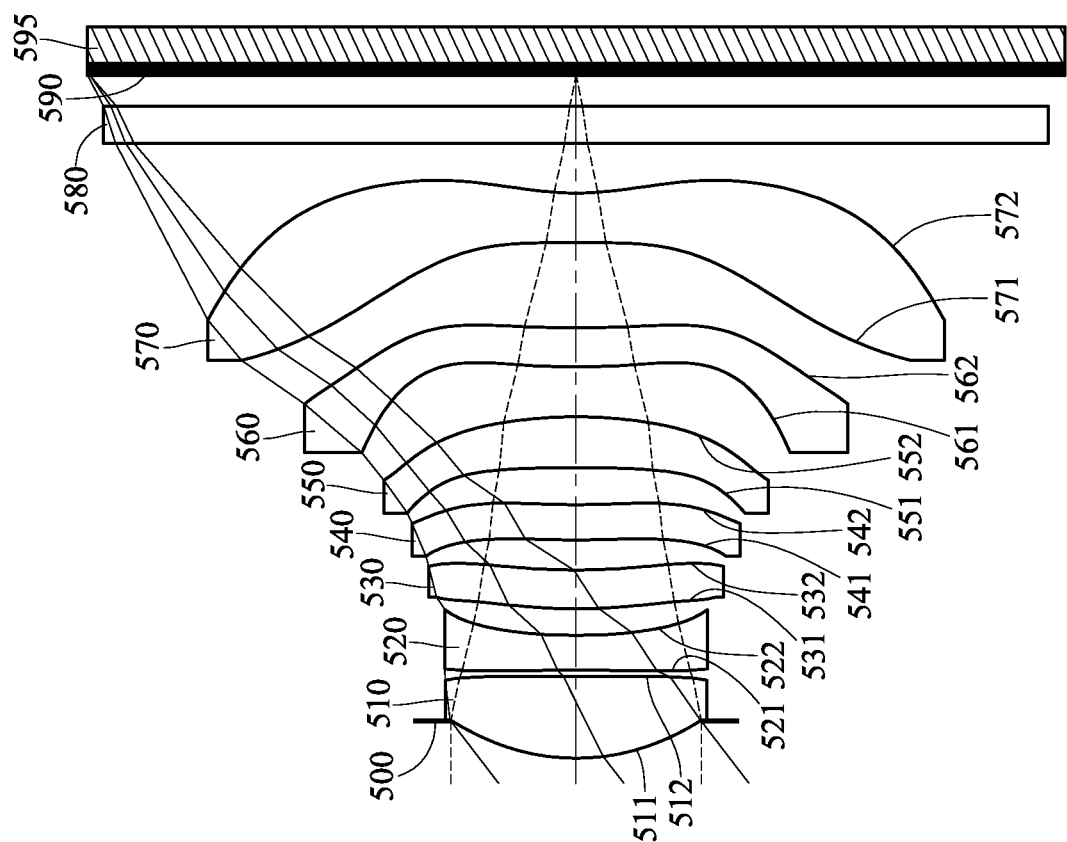
FIG. 9 is a schematic view of an image capturing unit according to the 5th embodiment of the present disclosure.
Figure 10:
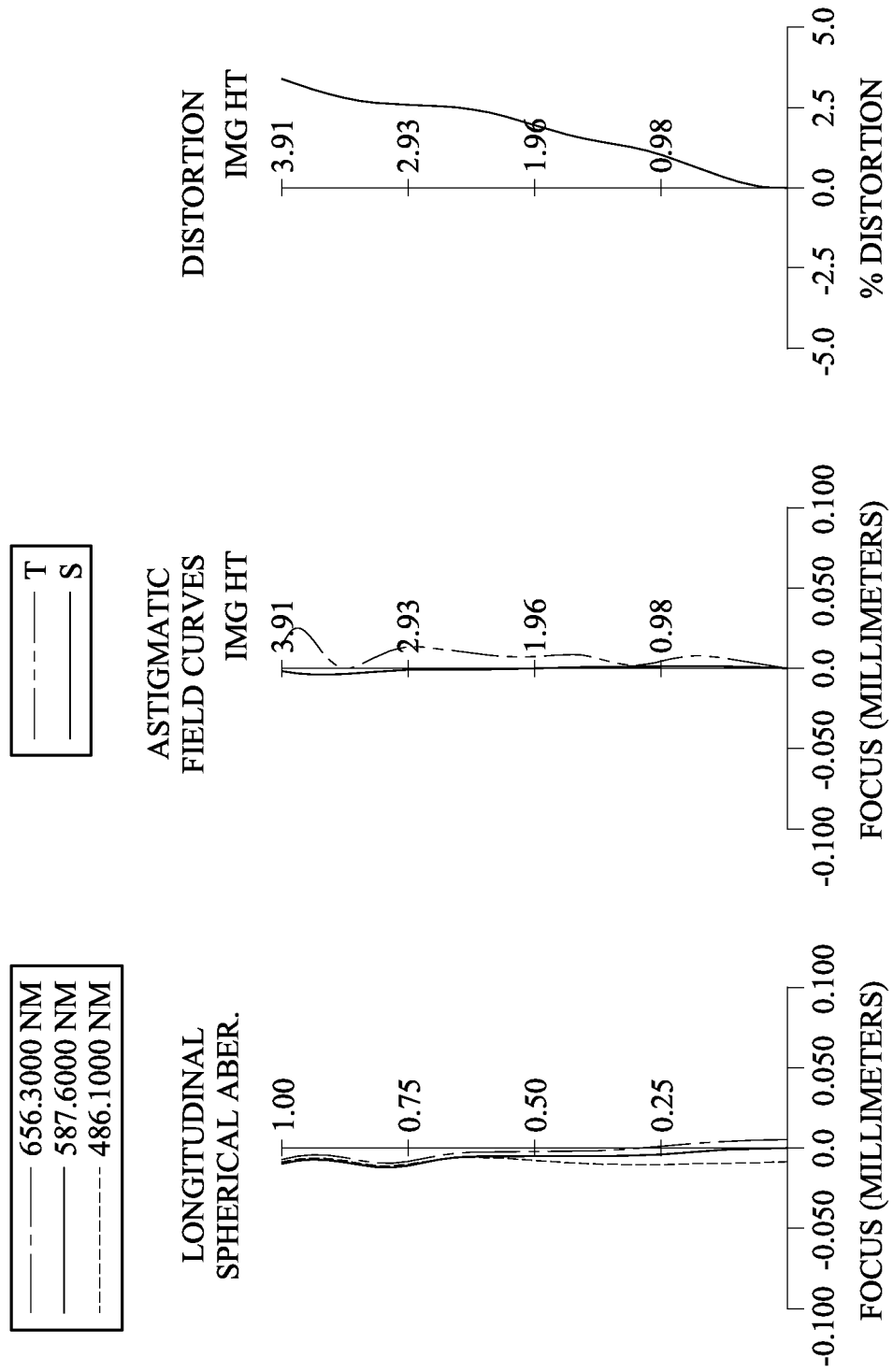
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing system (its reference numeral is omitted) of the present disclosure and an image sensor 595. The photographing system includes, in order from an object side to an image side, an aperture stop 500, a first lens element 510, a second lens element 520, a third lens element 530, a fourth lens element 540, a fifth lens element 550, a sixth lens element 560, a seventh lens element 570, an IR-cut filter 580 and an image surface 590, wherein the photographing system has a total of seven lens elements (510-570) with refractive power. The first lens element 510, the second lens element 520, the third lens element 530, the fourth lens element 540, the fifth lens element 550, the sixth lens element 560 and the seventh lens element 570 are all stationary relative to one another in a paraxial region thereof. There is an air gap in a paraxial region between every two of the first lens element 510, the second lens element 520, the third lens element 530, the fourth lens element 540, the fifth lens element 550, the sixth lens element 560 and the seventh lens element 570 that are adjacent to each other.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one concave shape in an off-axis region thereof. The image-side surface 562 of the sixth lens element 560 has at least one convex shape in an off-axis region thereof.

The seventh lens element 570 with negative refractive power has an object-side surface 571 being concave in a paraxial region thereof and an image-side surface 572 being concave in a paraxial region thereof. The seventh lens element 570 is made of plastic material and has the object-side surface 571 and the image-side surface 572 being both aspheric. The image-side surface 572 of the seventh lens element 570 has at least one convex shape in an off-axis region thereof.

The IR-cut filter 580 is made of glass and located between the seventh lens element 570 and the image surface 590, and will not affect the focal length of the photographing system. The image sensor 595 is disposed on or near the image surface 590 of the photographing system.

The detailed optical data of the 5th embodiment are shown in Table 9 and the aspheric surface data are shown in Table 10 below.

TABLE 9

5th Embodiment
f = 4.93 mm, Fno = 2.45, HFOV = 37.5 deg.

| Surface# |          | Curvature Radius |       | Thickness | Material | Index | Abbe # | Focal Length |
|----------|----------|------------------|-------|-----------|----------|-------|--------|--------------|
| 0        | Object   | Plano            |       | Infinity  |          |       |        |              |
| 1        | Ape. Stop| Plano            |       | −0.298    |          |       |        |              |
| 2        | Lens 1   | 1.768            | (ASP) | 0.659     | Plastic  | 1.535 | 55.7   | 3.40         |
| 3        |          | 56.102           | (ASP) | 0.050     |          |       |        |              |
| 4        | Lens 2   | −41.070          | (ASP) | 0.280     | Plastic  | 1.639 | 23.5   | −6.04        |
| 5        |          | 4.270            | (ASP) | 0.214     |          |       |        |              |
| 6        | Lens 3   | 4.288            | (ASP) | 0.312     | Plastic  | 1.544 | 55.9   | 47.77        |
| 7        |          | 5.004            | (ASP) | 0.242     |          |       |        |              |
| 8        | Lens 4   | 7.870            | (ASP) | 0.284     | Plastic  | 1.639 | 23.5   | −60.45       |
| 9        |          | 6.446            | (ASP) | 0.299     |          |       |        |              |
| 10       | Lens 5   | −11.573          | (ASP) | 0.408     | Plastic  | 1.544 | 55.9   | 10.73        |
| 11       |          | −3.928           | (ASP) | 0.403     |          |       |        |              |
| 12       | Lens 6   | 5.596            | (ASP) | 0.315     | Plastic  | 1.583 | 30.2   | 19.18        |
| 13       |          | 10.962           | (ASP) | 0.687     |          |       |        |              |
| 14       | Lens 7   | −46.920          | (ASP) | 0.398     | Plastic  | 1.544 | 55.9   | −4.02        |
| 15       |          | 2.304            | (ASP) | 0.400     |          |       |        |              |

TABLE 9-continued

5th Embodiment
f = 4.93 mm, Fno = 2.45, HFOV = 37.5 deg.

| Surface# | | Curvature Radius | Thickness | Material | Index | Abbe # | Focal Length |
|---|---|---|---|---|---|---|---|
| 16 | IR-cut filter | Plano | 0.300 | Glass | 1.517 | 64.2 | — |
| 17 | | Plano | 0.249 | | | | |
| 18 | Image | Plano | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k= | 3.9271E−02 | 4.0000E+01 | 9.0000E+01 | −6.1044E−01 | −9.4495E+00 |
| A4= | −1.5959E−03 | −5.3428E−02 | −2.9594E−02 | 1.3068E−02 | −1.3379E−02 |
| A6= | −3.3386E−03 | 6.9472E−02 | 7.1244E−02 | 2.2157E−02 | −2.5819E−02 |
| A8= | −1.0893E−03 | −5.9709E−02 | −1.6422E−02 | 1.1943E−02 | −2.6454E−02 |
| A10= | −5.7545E−03 | 1.8689E−02 | −2.2525E−02 | −1.5604E−03 | 3.8215E−02 |
| A12= | 6.4057E−03 | 6.4985E−04 | 2.1912E−02 | 1.2121E−02 | −8.1341E−03 |
| A14= | −6.5069E−03 | −6.7694E−03 | −7.4544E−03 | −5.0219E−03 | 2.6884E−03 |

| Surface # | 7 | 8 | 9 | 10 | 11 |
|---|---|---|---|---|---|
| k= | −1.8781E+01 | −9.0000E+01 | −2.9945E+01 | 6.9745E+01 | 2.5400E+00 |
| A4= | −6.3922E−03 | −1.0736E−01 | −1.1365E−01 | 5.5378E−02 | 6.9241E−03 |
| A6= | −1.6463E−02 | 2.8007E−02 | 1.5821E−02 | −6.5774E−02 | −4.5722E−02 |
| A8= | −1.4360E−02 | −1.8599E−03 | −2.0513E−03 | 4.8435E−02 | 4.1810E−02 |
| A10= | 1.4517E−03 | −6.7075E−03 | −8.9044E−03 | −5.2428E−02 | −2.9160E−02 |
| A12= | 2.7419E−03 | −4.3673E−04 | 1.1063E−02 | 2.3869E−02 | 9.1662E−03 |
| A14= | — | — | −4.0069E−03 | −2.9644E−03 | −8.0345E−04 |
| A16= | — | — | 5.7516E−04 | — | — |

| Surface # | 12 | 13 | 14 | 15 |
|---|---|---|---|---|
| k= | −1.0252E+01 | 1.1420E+01 | −1.0000E+00 | −1.1263E+01 |
| A4= | −8.3358E−03 | 3.0217E−02 | −1.4433E−01 | −7.8855E−02 |
| A6= | −7.6866E−02 | −1.0210E−01 | 4.3140E−02 | 2.0785E−02 |
| A8= | 1.6170E−02 | 4.7675E−02 | −3.9431E−03 | −2.0176E−03 |
| A10= | 8.0143E−03 | −1.0924E−02 | −5.0414E−04 | −3.1466E−04 |
| A12= | −4.7939E−03 | 1.3539E−03 | 1.5731E−04 | 9.8165E−05 |
| A14= | 6.6313E−04 | −7.3421E−05 | −1.4437E−05 | −9.3356E−06 |
| A16= | — | — | 4.7441E−07 | 3.1850E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.93 | ΣAT/(T34 + T45) | 3.50 |
| Fno | 2.45 | (f/R12) − (f/R13) | 0.55 |
| HFOV [deg.] | 37.5 | \|f1/f2\| | 0.56 |
| V2 | 23.5 | \|f/f3\| + \|f/f4\| + \|f/f5\| | 0.64 |
| V1 − V2 | 32.20 | f/f345 | 0.46 |
| Dr1r8/Dr9r14 | 0.92 | | |

6th Embodiment

Figure 11:
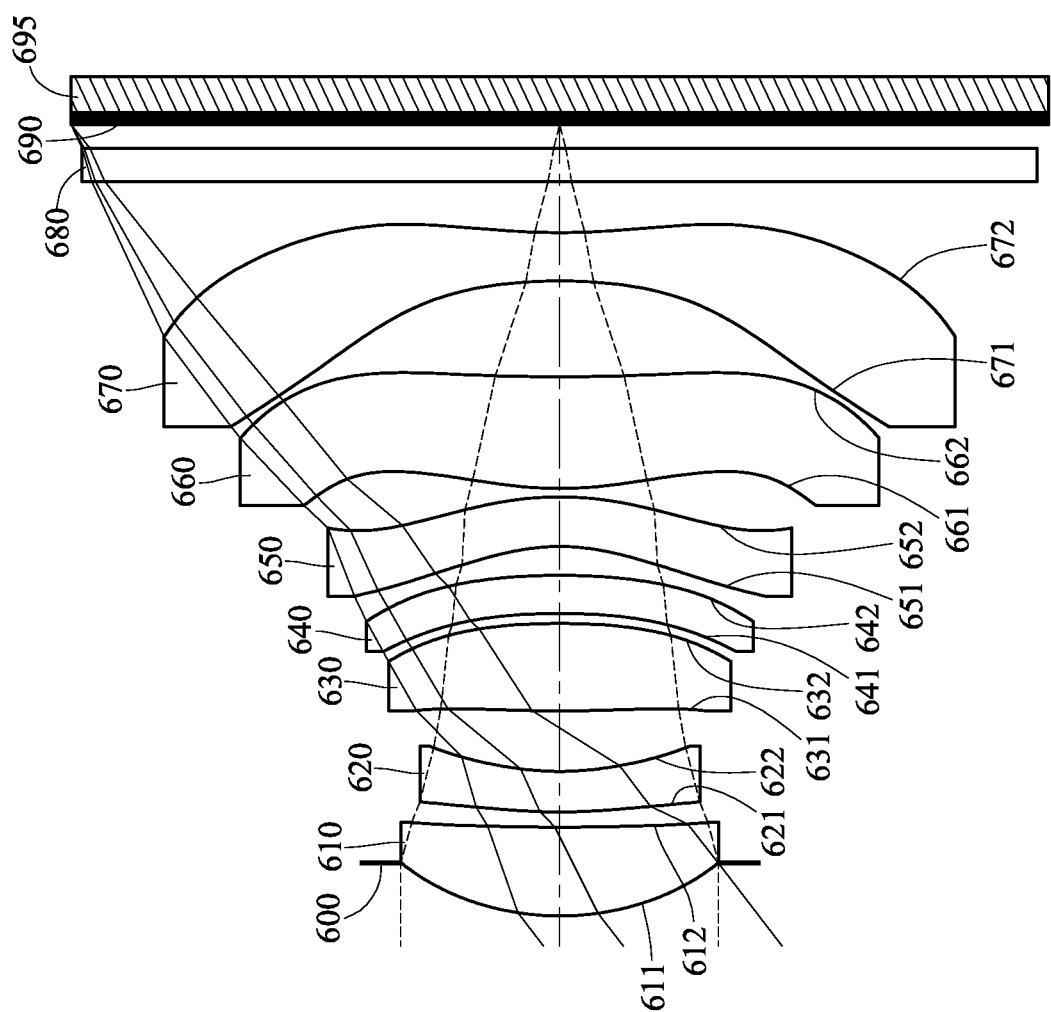
FIG. 11 is a schematic view of an image capturing unit according to the 6th embodiment of the present disclosure.
Figure 12:
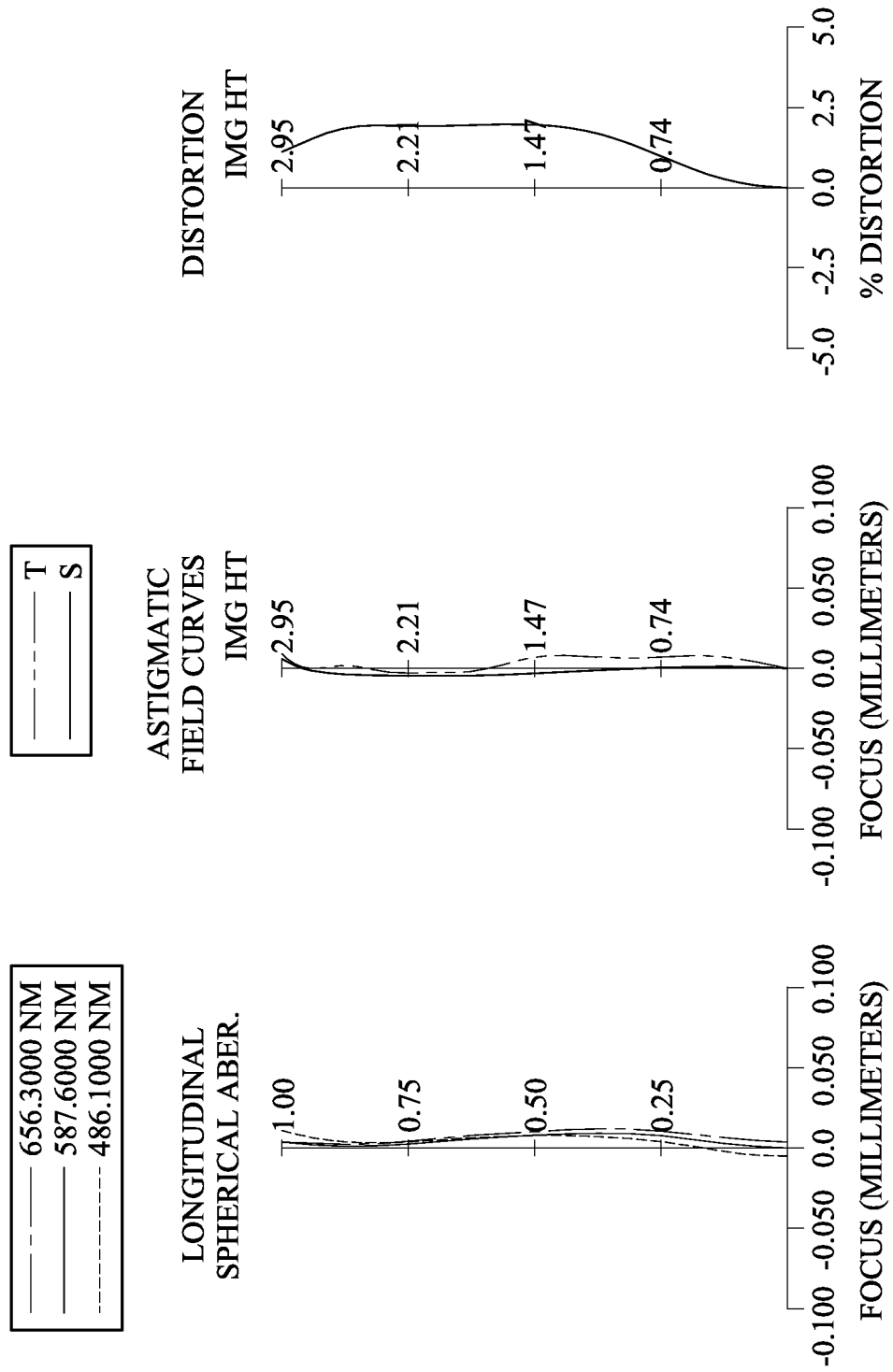
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing system (its reference numeral is omitted) of the present disclosure and an image sensor 695. The photographing system includes, in order from an object side to an image side, an aperture stop 600, a first lens element 610, a second lens element 620, a third lens element 630, a fourth lens element 640, a fifth lens element 650, a sixth lens element 660, a seventh lens element 670, an IR-cut filter 680 and an image surface 690, wherein the photographing system has a total of seven lens elements (610-670) with refractive power. The first lens element 610, the second lens element 620, the third lens element 630, the fourth lens element 640, the fifth lens element 650, the sixth lens element 660 and the seventh lens element 670 are all stationary relative to one another in a paraxial region thereof. There is an air gap in a paraxial region between every two of the first lens element 610, the second lens element 620, the third lens element 630, the fourth lens element 640, the fifth lens element 650, the sixth lens element 660 and the seventh lens element 670 that are adjacent to each other.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one concave shape in an off-axis region thereof. The image-side surface 662 of the sixth lens element 660 has at least one convex shape in an off-axis region thereof.

The seventh lens element 670 with negative refractive power has an object-side surface 671 being concave in a paraxial region thereof and an image-side surface 672 being concave in a paraxial region thereof. The seventh lens element 670 is made of plastic material and has the object-side surface 671 and the image-side surface 672 being both aspheric. The image-side surface 672 of the seventh lens element 670 has at least one convex shape in an off-axis region thereof.

The IR-cut filter 680 is made of glass and located between the seventh lens element 670 and the image surface 690, and will not affect the focal length of the photographing system. The image sensor 695 is disposed on or near the image surface 690 of the photographing system.

The detailed optical data of the 6th embodiment are shown in Table 11 and the aspheric surface data are shown in Table 12 below.

TABLE 11

6th Embodiment
f = 3.80 mm, Fno = 1.98, HFOV = 37.5 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.318 | | | | |
| 2 | Lens 1 | 1.660 | (ASP) | 0.537 | Plastic | 1.544 | 55.9 | 3.47 |
| 3 | | 12.273 | (ASP) | 0.092 | | | | |
| 4 | Lens 2 | 3.330 | (ASP) | 0.245 | Plastic | 1.639 | 23.5 | −6.69 |
| 5 | | 1.818 | (ASP) | 0.366 | | | | |
| 6 | Lens 3 | 8.541 | (ASP) | 0.528 | Plastic | 1.535 | 55.7 | 5.22 |
| 7 | | −4.055 | (ASP) | 0.060 | | | | |
| 8 | Lens 4 | −3.918 | (ASP) | 0.230 | Plastic | 1.614 | 25.6 | −126.54 |
| 9 | | −4.218 | (ASP) | 0.175 | | | | |
| 10 | Lens 5 | −1.225 | (ASP) | 0.300 | Plastic | 1.614 | 25.6 | −6.84 |
| 11 | | −1.890 | (ASP) | 0.050 | | | | |
| 12 | Lens 6 | 2.097 | (ASP) | 0.675 | Plastic | 1.544 | 55.9 | 4.54 |
| 13 | | 12.313 | (ASP) | 0.580 | | | | |
| 14 | Lens 7 | −3.059 | (ASP) | 0.292 | Plastic | 1.535 | 55.7 | −3.23 |
| 15 | | 4.104 | (ASP) | 0.310 | | | | |
| 16 | IR-cut filter | Plano | | 0.200 | Glass | 1.517 | 64.2 | — |
| 17 | | Plano | | 0.142 | | | | |
| 18 | Image | Plano | | — | | | | |

Note:
Reference wavelength is 587.6 nm (d-line).
Effective radius of surface 11 is 1.400 mm.

TABLE 12

Aspheric Coefficients

| Surface # | 2 | 3 | 4 | 5 | 6 |
|---|---|---|---|---|---|
| k= | −2.3265E−02 | 1.0000E+01 | −2.5499E+01 | −4.8861E+00 | −1.0000E+00 |
| A4= | 6.3659E−03 | −8.0057E−02 | −1.3467E−01 | −6.0233E−02 | −6.4068E−02 |
| A6= | 1.9529E−02 | 2.1444E−01 | 2.8774E−01 | 1.9541E−01 | 4.5669E−03 |
| A8= | −2.7679E−02 | −2.8820E−01 | −3.9527E−01 | −1.7958E−01 | −5.5809E−02 |
| A10= | 3.6299E−02 | 2.1958E−01 | 3.9961E−01 | 7.5264E−02 | 5.2159E−02 |
| A12= | −1.3490E−02 | −4.0489E−02 | −3.2083E−01 | 9.5720E−02 | −3.1446E−02 |
| A14= | 2.9287E−03 | −4.9456E−02 | 1.7339E−01 | −1.4441E−01 | 1.9873E−02 |
| A16= | −9.0555E−04 | 1.4853E−02 | −6.1122E−02 | 5.9649E−02 | 2.9564E−03 |

| Surface # | 7 | 8 | 9 | 10 | 11 |
|---|---|---|---|---|---|
| k= | 8.8598E+00 | 9.8492E+00 | 5.3732E+00 | −6.3648E+00 | −8.2947E−01 |
| A4= | −5.4576E−02 | −6.6158E−02 | −5.7893E−02 | 1.5653E−02 | 8.4047E−02 |
| A6= | −2.6424E−02 | 1.9517E−02 | 5.5584E−02 | 4.7473E−03 | −1.1716E−02 |
| A8= | 7.0055E−03 | 8.0045E−03 | −1.5171E−01 | 1.1483E−03 | 1.8725E−02 |
| A10= | 1.3962E−02 | 3.5053E−03 | 2.3797E−01 | −2.8584E−03 | −5.4917E−03 |
| A12= | 4.0109E−03 | 4.6121E−03 | −2.3131E−01 | 1.8727E−03 | −6.6369E−04 |
| A14= | −1.9337E−03 | 2.2693E−03 | 1.2464E−01 | 1.0961E−03 | 2.6290E−04 |
| A16= | −1.5487E−03 | −2.8316E−03 | −2.7289E−02 | −9.6837E−04 | — |

| Surface # | 12 | 13 | 14 | 15 |
|---|---|---|---|---|
| k= | −1.9457E+01 | 9.3259E+00 | 5.2106E−01 | −7.4915E+00 |
| A4= | −1.7518E−02 | 2.1927E−02 | −3.1905E−02 | −6.6764E−02 |
| A6= | −3.6621E−02 | −6.7859E−02 | −6.3825E−02 | −3.7548E−03 |
| A8= | 1.5738E−02 | 4.3398E−02 | 5.6545E−02 | 1.0680E−02 |
| A10= | 4.3524E−04 | −1.7567E−02 | −1.5869E−02 | −4.1816E−03 |
| A12= | −7.1276E−03 | 4.1763E−03 | 1.4618E−03 | 8.4984E−04 |
| A14= | 3.1671E−03 | −5.2169E−04 | 7.9648E−05 | −9.3204E−05 |
| A16= | −3.7171E−04 | 2.5522E−05 | −1.5105E−05 | 4.2174E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.80 | ΣAT/(T34 + T45) | 5.63 |
| Fno | 1.98 | (f/R12) − (f/R13) | 1.55 |
| HFOV [deg.] | 37.5 | \|f1/f2\| | 0.52 |
| V2 | 23.5 | \|f/f3\| + \|f/f4\| + \|f/f5\| | 1.31 |
| V1 − V2 | 32.20 | f/f345 | 0.13 |
| Dr1r8/Dr9r14 | 1.08 | | |

7th Embodiment

Figure 13:
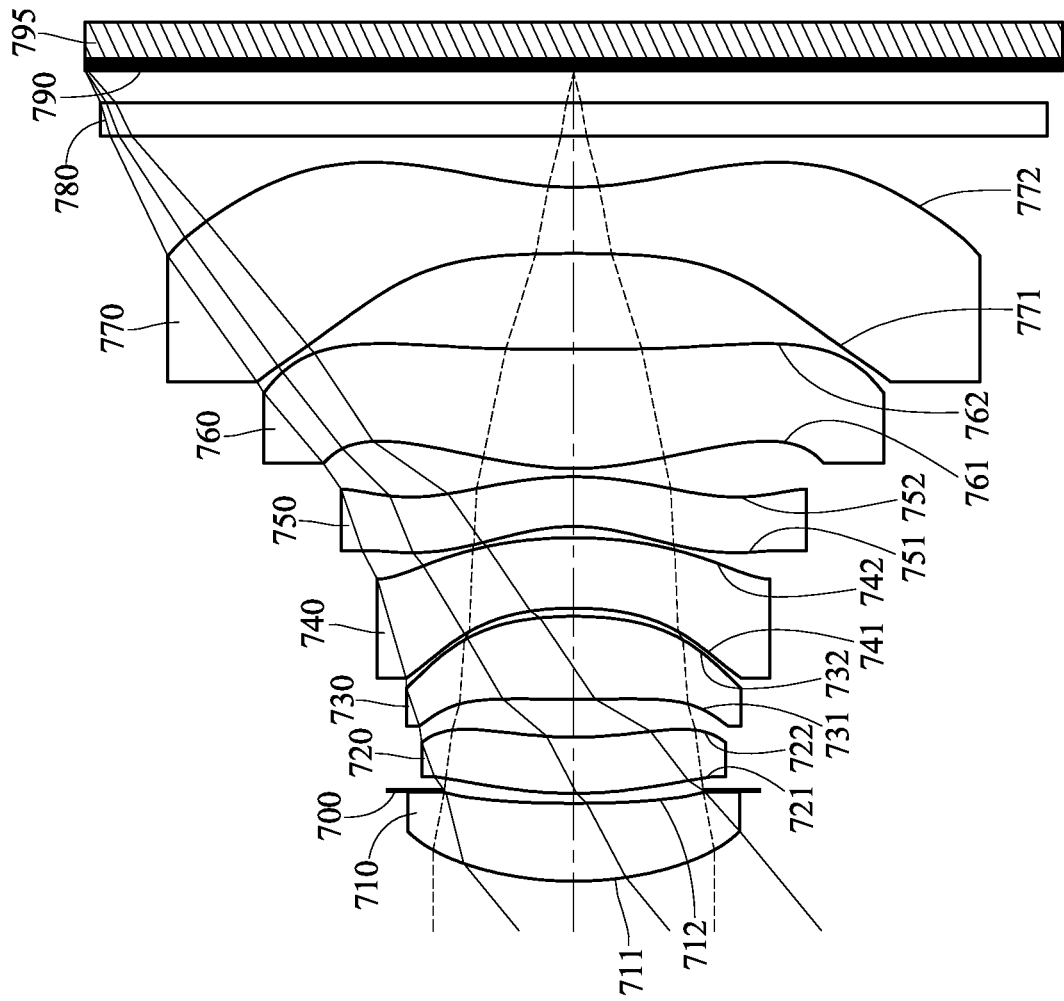
FIG. 13 is a schematic view of an image capturing unit according to the 7th embodiment of the present disclosure.
Figure 14:
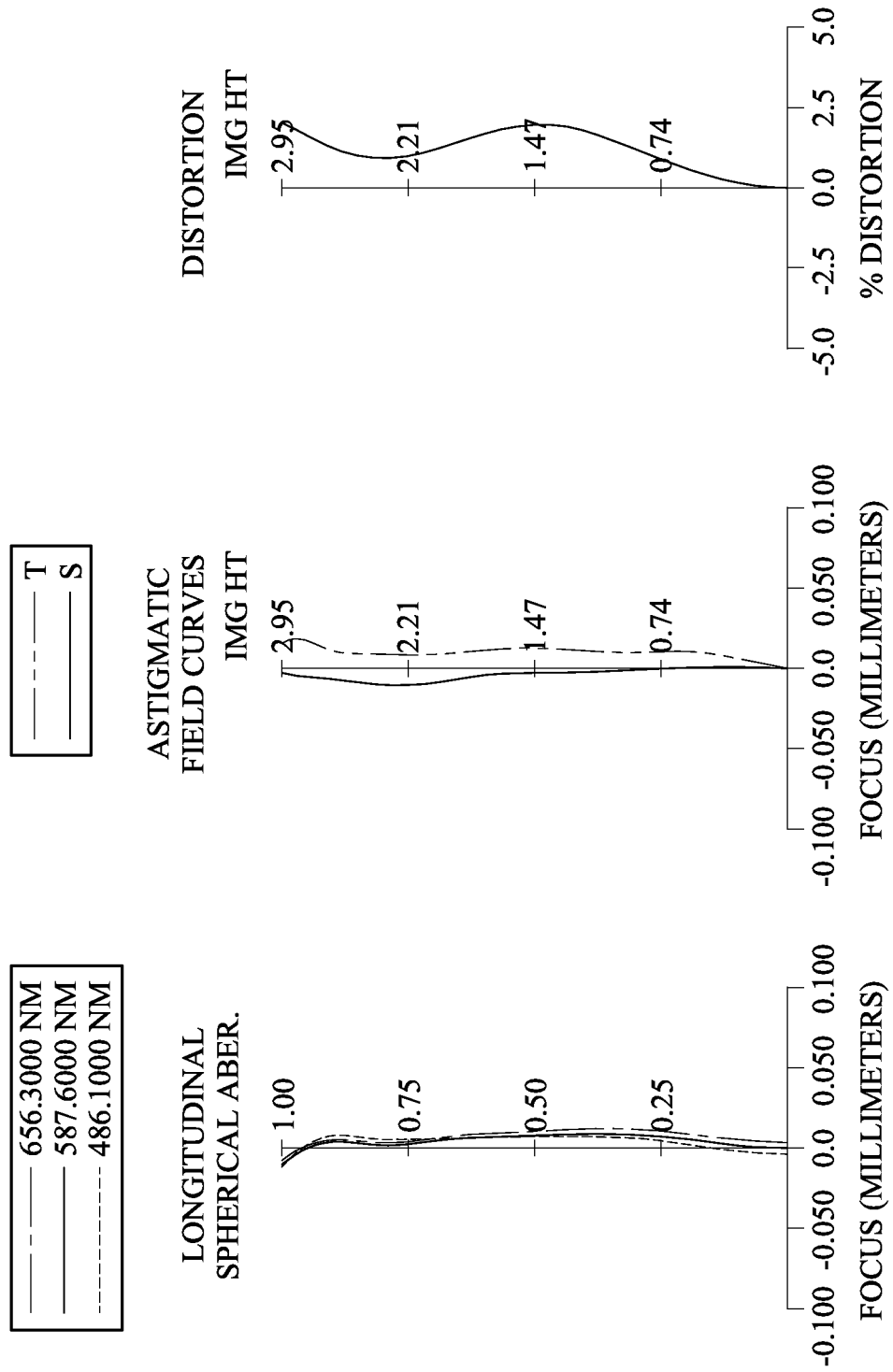
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing system (its reference numeral is omitted) of the present disclosure and an image sensor 795. The photographing system includes, in order from an object side to an image side, a first lens element 710, an aperture stop 700, a second lens element 720, a third lens element 730, a fourth lens element 740, a fifth lens element 750, a sixth lens element 760, a seventh lens element 770, an IR-cut filter 780 and an image surface 790, wherein the photographing system has a total of seven lens elements (710-770) with refractive power. The first lens element 710, the second lens element 720, the third lens element 730, the fourth lens element 740, the fifth lens element 750, the sixth lens element 760 and the seventh lens element 770 are all stationary relative to one another in a paraxial region thereof. There is an air gap in a paraxial region between every two of the first lens element 710, the second lens element 720, the third lens element 730, the fourth lens element 740, the fifth lens element 750, the sixth lens element 760 and the seventh lens element 770 that are adjacent to each other.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has at least one concave shape in an off-axis region thereof. The image-side surface 762 of the sixth lens element 760 has at least one convex shape in an off-axis region thereof.

The seventh lens element 770 with negative refractive power has an object-side surface 771 being concave in a paraxial region thereof and an image-side surface 772 being concave in a paraxial region thereof. The seventh lens element 770 is made of plastic material and has the object-side surface 771 and the image-side surface 772 being both aspheric. The image-side surface 772 of the seventh lens element 770 has at least one convex shape in an off-axis region thereof.

The IR-cut filter 780 is made of glass and located between the seventh lens element 770 and the image surface 790, and will not affect the focal length of the photographing system. The image sensor 795 is disposed on or near the image surface 790 of the photographing system.

The detailed optical data of the 7th embodiment are shown in Table 13 and the aspheric surface data are shown in Table 14 below.

TABLE 13

7th Embodiment
f = 3.51 mm, Fno = 2.07, HFOV = 39.4 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.201 | (ASP) | 0.470 | Plastic | 1.544 | 55.9 | 6.40 |
| 2 | | 5.534 | (ASP) | 0.077 | | | | |
| 3 | Ape. Stop | Plano | | −0.017 | | | | |
| 4 | Lens 2 | 2.312 | (ASP) | 0.341 | Plastic | 1.544 | 55.9 | 31.87 |
| 5 | | 2.529 | (ASP) | 0.229 | | | | |
| 6 | Lens 3 | 15.572 | (ASP) | 0.501 | Plastic | 1.544 | 55.9 | 3.73 |
| 7 | | −2.308 | (ASP) | 0.050 | | | | |
| 8 | Lens 4 | −1.991 | (ASP) | 0.425 | Plastic | 1.639 | 23.5 | −13.78 |
| 9 | | −2.787 | (ASP) | 0.069 | | | | |
| 10 | Lens 5 | −1.120 | (ASP) | 0.300 | Plastic | 1.639 | 23.5 | −4.63 |
| 11 | | −1.992 | (ASP) | 0.050 | | | | |
| 12 | Lens 6 | 1.794 | (ASP) | 0.720 | Plastic | 1.544 | 55.9 | 3.34 |
| 13 | | 121.752 | (ASP) | 0.580 | | | | |
| 14 | Lens 7 | −8.838 | (ASP) | 0.400 | Plastic | 1.544 | 55.9 | −2.95 |
| 15 | | 1.989 | (ASP) | 0.310 | | | | |
| 16 | IR-cut filter | Plano | | 0.200 | Glass | 1.517 | 64.2 | — |
| 17 | | Plano | | 0.195 | | | | |
| 18 | Image | Plano | | — | | | | |

Note:
Reference wavelength is 587.6 nm (d-line).

TABLE 14

Aspheric Coefficients

| Surface # | 1 | 2 | 4 | 5 | 6 |
|---|---|---|---|---|---|
| k= | 2.6138E−01 | −2.0537E+01 | −4.7803E+00 | −4.7705E+00 | −1.0000E+00 |
| A4= | 8.1081E−03 | −8.1050E−02 | −1.5997E−01 | −1.3501E−01 | −1.2599E−01 |
| A6= | 3.0050E−02 | 3.3025E−01 | 3.4966E−01 | −8.8107E−02 | −1.0028E−01 |
| A8= | −3.5734E−02 | −3.5845E−01 | −6.2036E−01 | 8.5801E−02 | −7.4847E−02 |
| A10= | 7.6055E−02 | 2.4175E−01 | 8.4893E−01 | −3.8375E−01 | −3.6298E−02 |
| A12= | −1.7011E−02 | 3.5173E−02 | −9.2063E−01 | 3.6112E−01 | −7.3642E−02 |
| A14= | −4.9322E−02 | −4.7817E−02 | 5.8447E−01 | −1.9399E−01 | 7.0546E−02 |
| A16= | 4.2690E−02 | 5.5762E−02 | −1.9510E−01 | 5.5798E−02 | 1.1109E−01 |

| Surface # | 7 | 8 | 9 | 10 | 11 |
|---|---|---|---|---|---|
| k= | 2.3826E+00 | 2.1967E+00 | 1.0000E−01 | −5.7792E+00 | −1.7394E+00 |
| A4= | −2.1867E−01 | −2.3898E−01 | −5.6902E−02 | 1.2840E−01 | 1.0842E−01 |
| A6= | −9.0637E−03 | 3.9903E−02 | 7.8166E−02 | 9.9593E−03 | 8.3228E−03 |
| A8= | 1.3529E−02 | 8.3262E−02 | −1.4459E−01 | −1.1907E−02 | 1.1317E−02 |
| A10= | 5.3081E−02 | 2.8975E−02 | 2.4076E−01 | −1.0814E−02 | −9.8670E−03 |

TABLE 14-continued

| Aspheric Coefficients | | | | | |
|---|---|---|---|---|---|
| A12= | 2.2363E−02 | 2.3308E−02 | −2.3324E−01 | 2.4497E−03 | −1.2972E−03 |
| A14= | −1.6846E−02 | 1.8296E−02 | 1.2205E−01 | 3.7424E−03 | 8.2692E−04 |
| A16= | 1.1981E−03 | −2.1303E−02 | −2.4198E−02 | −1.8079E−03 | |

| Surface # | 12 | 13 | 14 | 15 |
|---|---|---|---|---|
| k= | −1.4625E+01 | 1.0000E+01 | 9.9847E+00 | −3.0381E+00 |
| A4= | 1.1432E−02 | 1.0655E−01 | −8.1518E−02 | −1.1986E−01 |
| A6= | −4.3054E−02 | −1.4661E−01 | −3.5435E−02 | 4.5316E−02 |
| A8= | 1.8657E−02 | 1.0308E−01 | 1.5124E−02 | −1.5720E−02 |
| A10= | 1.3287E−03 | −4.6724E−02 | 1.4995E−02 | 4.0575E−03 |
| A12= | −9.1760E−03 | 1.2782E−02 | −1.0281E−02 | −7.1080E−04 |
| A14= | 4.5440E−03 | −1.9542E−03 | 2.3332E−03 | 7.5489E−05 |
| A16= | −7.7703E−04 | 1.2654E−04 | −1.8882E−04 | −3.5905E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.51 | ΣAT/(T34 + T45) | 8.72 |
| Fno | 2.07 | (f/R12) − (f/R13) | 0.43 |
| HFOV [deg.] | 39.4 | \|f1/f2\| | 0.20 |
| V2 | 55.9 | \|f/f3\| + \|f/f4\| + \|f/f5\| | 1.95 |
| V1 − V2 | 0.00 | f/f345 | −0.14 |
| Dr1r8/Dr9r14 | 1.01 | | |

8th Embodiment

Figure 15:
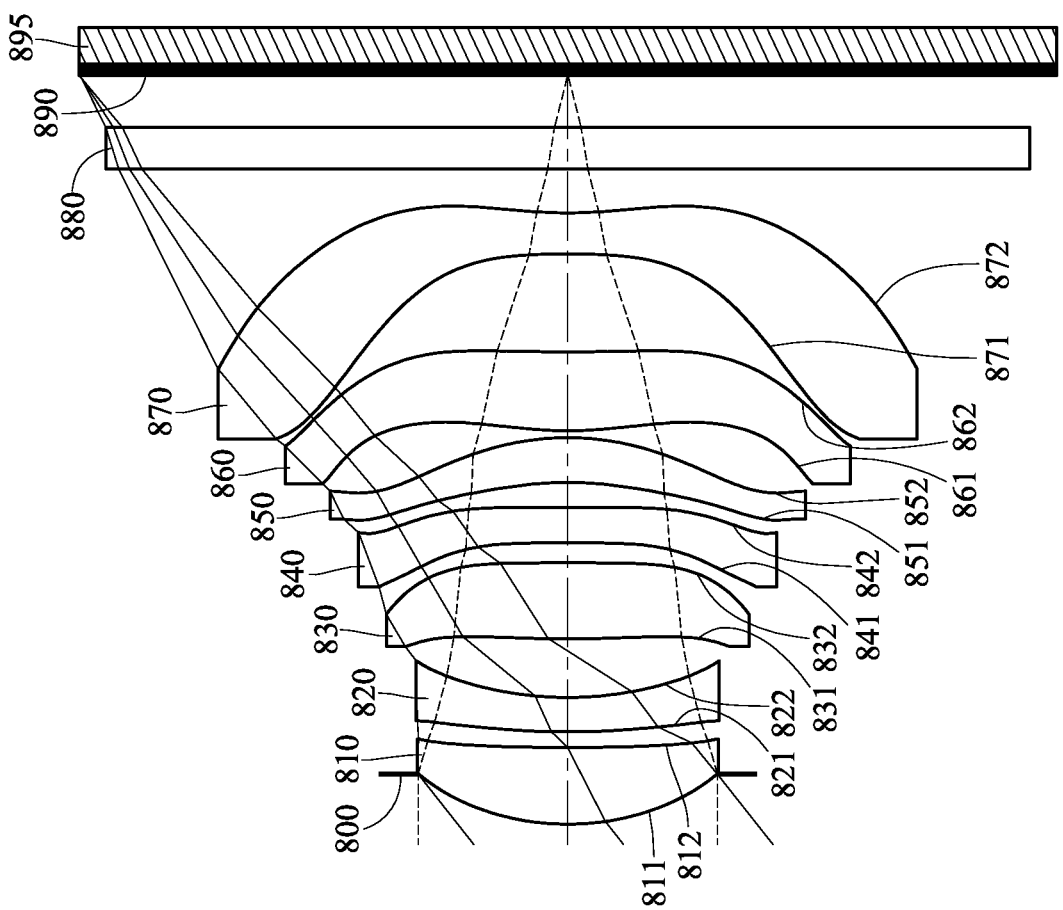
FIG. 15 a schematic view of an image capturing unit according to the 8th embodiment of the present disclosure.
Figure 16:
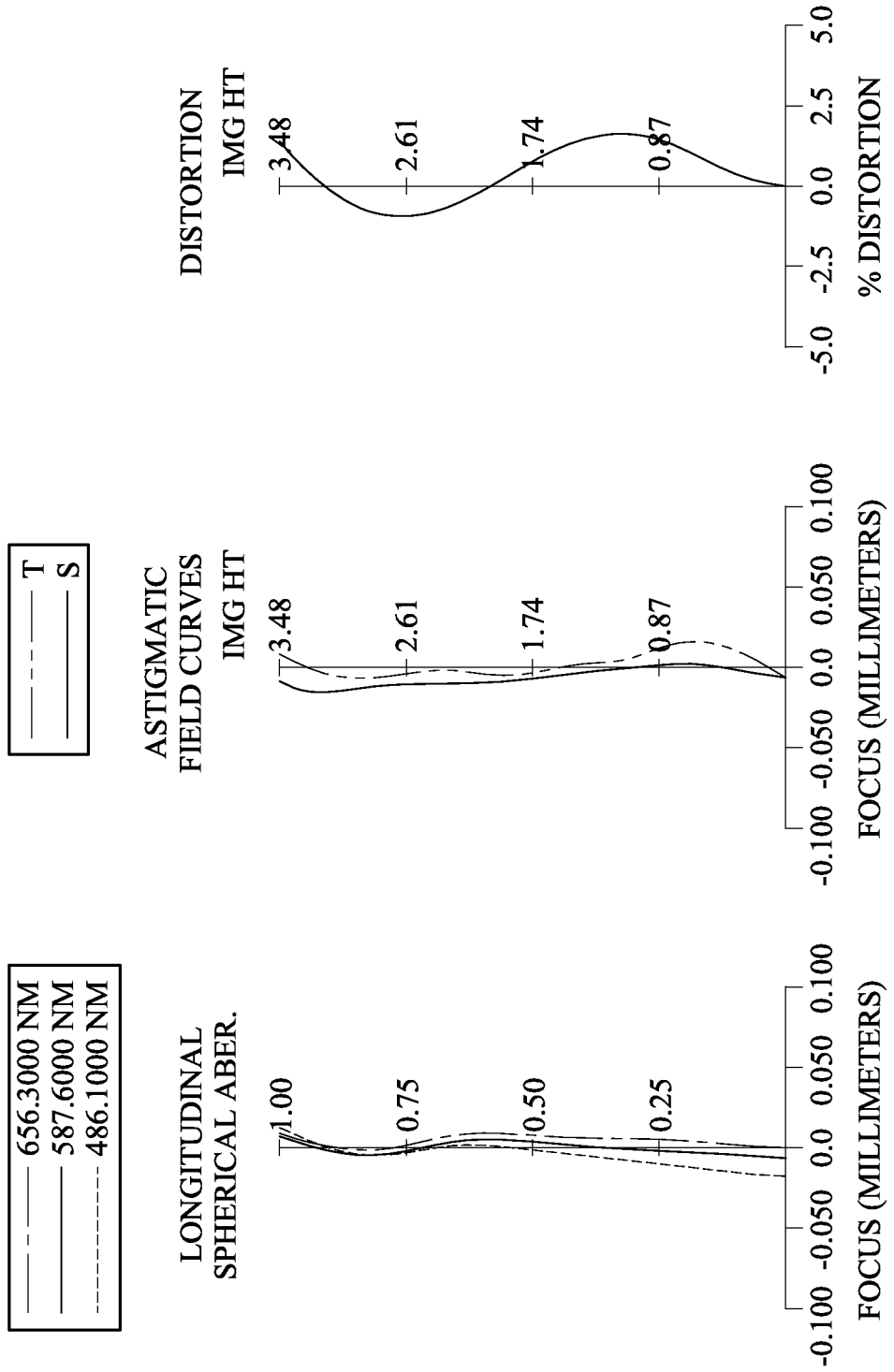
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing system (its reference numeral is omitted) of the present disclosure and an image sensor 895. The photographing system includes, in order from an object side to an image side, an aperture stop 800, a first lens element 810, a second lens element 820, a third lens element 830, a fourth lens element 840, a fifth lens element 850, a sixth lens element 860, a seventh lens element 870, an IR-cut filter 880 and an image surface 890, wherein the photographing system has a total of seven lens elements (810-870) with refractive power. The first lens element 810, the second lens element 820, the third lens element 830, the fourth lens element 840, the fifth lens element 850, the sixth lens element 860 and the seventh lens element 870 are all stationary relative to one another in a paraxial region thereof. There is an air gap in a paraxial region between every two of the first lens element 810, the second lens element 820, the third lens element 830, the fourth lens element 840, the fifth lens element 850, the sixth lens element 860 and the seventh lens element 870 that are adjacent to each other.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has at least one concave shape in an off-axis region thereof. The image-side surface 862 of the sixth lens element 860 has at least one convex shape in an off-axis region thereof.

The seventh lens element 870 with negative refractive power has an object-side surface 871 being concave in a paraxial region thereof and an image-side surface 872 being concave in a paraxial region thereof. The seventh lens element 870 is made of plastic material and has the object-side surface 871 and the image-side surface 872 being both aspheric. The image-side surface 872 of the seventh lens element 870 has at least one convex shape in an off-axis region thereof.

The IR-cut filter 880 is made of glass and located between the seventh lens element 870 and the image surface 890, and will not affect the focal length of the photographing system. The image sensor 895 is disposed on or near the image surface 890 of the photographing system.

The detailed optical data of the 8th embodiment are shown in Table 15 and the aspheric surface data are shown in Table 16 below.

TABLE 15

8th Embodiment
f = 4.33 mm, Fno = 2.03, HFOV = 38.4 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.357 | | | | |
| 2 | Lens 1 | 1.856 | (ASP) | 0.546 | Plastic | 1.560 | 56.0 | 3.86 |
| 3 | | 11.633 | (ASP) | 0.112 | | | | |
| 4 | Lens 2 | 4.450 | (ASP) | 0.245 | Plastic | 1.660 | 21.0 | −7.58 |
| 5 | | 2.303 | (ASP) | 0.419 | | | | |
| 6 | Lens 3 | 8.749 | (ASP) | 0.542 | Plastic | 1.560 | 56.0 | 15.33 |
| 7 | | −444.319 | (ASP) | 0.143 | | | | |
| 8 | Lens 4 | −46.895 | (ASP) | 0.250 | Plastic | 1.600 | 32.0 | −21.40 |
| 9 | | 17.713 | (ASP) | 0.181 | | | | |
| 10 | Lens 5 | −2.257 | (ASP) | 0.318 | Plastic | 1.560 | 56.0 | 19.53 |
| 11 | | −1.966 | (ASP) | 0.050 | | | | |
| 12 | Lens 6 | 2.738 | (ASP) | 0.561 | Plastic | 1.560 | 56.0 | 6.16 |
| 13 | | 12.313 | (ASP) | 0.700 | | | | |
| 14 | Lens 7 | −6.361 | (ASP) | 0.292 | Plastic | 1.560 | 56.0 | −3.69 |
| 15 | | 3.115 | (ASP) | 0.310 | | | | |
| 16 | IR-cut filter | Plano | | 0.300 | Glass | 1.517 | 64.2 | — |
| 17 | | Plano | | 0.368 | | | | |
| 18 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k= | −2.1880E−02 | −3.0000E+01 | −1.9542E+01 | −4.4496E+00 | −1.0000E+00 |
| A4= | 5.5012E−03 | −4.2990E−02 | −1.0428E−01 | −5.0033E−02 | −4.6326E−02 |
| A6= | 9.3604E−03 | 1.2625E−01 | 2.4979E−01 | 1.6305E−01 | −1.6375E−02 |
| A8= | −1.4197E−02 | −1.6433E−01 | −4.1241E−01 | −2.0224E−01 | −4.3482E−03 |
| A10= | 2.0744E−02 | 1.1033E−01 | 5.5494E−01 | 2.2551E−01 | 1.7310E−02 |
| A12= | 8.6700E−04 | 3.1130E−02 | −5.1950E−01 | −1.8057E−01 | −1.9138E−02 |
| A14= | −1.4709E−02 | −8.9067E−02 | 2.7578E−01 | 8.5000E−02 | −7.9946E−03 |
| A16= | 7.8947E−03 | 3.6512E−02 | −6.3529E−02 | −1.5636E−02 | 9.7877E−03 |

| Surface # | 7 | 8 | 9 | 10 | 11 |
|---|---|---|---|---|---|
| k= | −3.0000E+01 | −3.0000E+01 | −3.0000E+01 | −1.7654E+01 | −3.6147E−01 |
| A4= | −7.1744E−02 | −1.6177E−01 | −1.1249E−01 | 1.7471E−02 | −6.1712E−03 |
| A6= | −4.2104E−02 | 8.6448E−03 | 3.1544E−02 | −2.7356E−02 | 1.2858E−02 |
| A8= | 3.6360E−03 | 5.7906E−03 | −4.1788E−02 | 3.4043E−04 | 9.4765E−03 |
| A10= | −6.4873E−03 | 8.0492E−03 | 5.8318E−02 | 1.7761E−03 | −1.2794E−03 |
| A12= | 3.2991E−03 | 2.8954E−03 | −4.1849E−02 | 1.2167E−03 | −2.7139E−04 |
| A14= | 3.8455E−03 | −5.9588E−05 | 1.5951E−02 | 2.3355E−04 | −1.8358E−05 |
| A16= | −2.0694E−03 | −1.1695E−03 | −2.3502E−03 | −1.9500E−04 | |

| Surface # | 12 | 13 | 14 | 15 |
|---|---|---|---|---|
| k= | −3.0000E+01 | 4.5984E−01 | −2.6869E+01 | −6.5262E+00 |
| A4= | −3.0609E−02 | −3.1322E−02 | −1.8801E−02 | −1.4199E−01 |
| A6= | −7.3723E−02 | −5.5240E−02 | 3.5183E−02 | 4.9946E−02 |
| A8= | 8.1443E−02 | 4.1654E−02 | −3.6592E−03 | −1.3885E−02 |
| A10= | −5.1968E−02 | −1.8208E−02 | −1.3605E−04 | 2.5644E−03 |
| A12= | 2.1245E−02 | 5.0383E−03 | 6.6904E−04 | −2.4963E−04 |
| A14= | −5.3090E−03 | −7.9598E−04 | −1.6512E−04 | 5.3178E−06 |
| A16= | 5.8123E−04 | 5.4859E−05 | 1.1125E−05 | 5.1910E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.33 | ΣAT/(T34 + T45) | 4.95 |
| Fno | 2.03 | (f/R12) − (f/R13) | 1.03 |
| HFOV [deg.] | 38.4 | \|f1/f2\| | 0.51 |
| V2 | 21.0 | \|f/f3\| + \|f/f4\| + \|f/f5\| | 0.71 |
| V1 − V2 | 35.20 | f/f345 | 0.27 |
| Dr1r8/Dr9r14 | 1.17 | | |

The foregoing image capturing unit is able to be installed in, but not limited to, an electronic device. According to the present disclosure, the photographing system has a total of seven lens elements with refractive power. The image-side surface of the sixth lens element is concave in a paraxial region thereof, and the object-side surface of the seventh lens element is concave in a paraxial region thereof. Therefore, it is favorable for the exit pupil of the photographing system being positioned towards the image surface of the photographing system so as to effectively reduce the back focal length of the photographing system, thereby keeping a compact size thereof. When specific conditions are satisfied, it is favorable for allocating the curvatures of the sixth lens element and the seventh lens element so as to reduce the sensitivity of the photographing system and increase the manufacturing yield rate. According to the present disclosure, the photographing system is favorable for satisfying the requirements of high image quality and compact size simultaneously.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing system comprising seven lens elements, the seven lens elements being, in order from an object side to an image side, a first lens element, a second lens element, a third lens element, a fourth lens element, a fifth lens element, a sixth lens element and a seventh lens element;
wherein the first lens element has positive refractive power, the third lens element has negative refractive power, the seventh lens element has negative refractive power, the sixth lens element has an image-side surface having at least one inflection point in an off-axis region thereof, a total number of lens elements with refractive power in the photographing system is seven, a central thickness of the seventh lens element is larger than a central thickness of the sixth lens element, and an absolute value of a curvature radius of an object-side surface of the second lens element is larger than an absolute value of a curvature radius of an image-side surface of the second lens element;
wherein a focal length of the photographing system is f, a focal length of the third lens element is f3, a focal length of the fourth lens element is f4, a focal length of the fifth lens element is f5, an f-number of the photographing system is Fno, and the following conditions are satisfied:

$|f/f3|+|f/f4|+|f/f5|<1.5;$ and $Fno≤2.25.$

2. The photographing system of claim 1, wherein the fifth lens element has positive refractive power.

3. The photographing system of claim 1, wherein the focal length of the photographing system is f, a composite focal length of the third lens element, the fourth lens element and the fifth lens element is f345, and the following condition is satisfied:

$-0.30<f/f345<0.60.$

4. The photographing system of claim 1, wherein an axial distance between the fourth lens element and the fifth lens element is larger than an axial distance between the third lens element and the fourth lens element.

5. The photographing system of claim 1, wherein an axial distance between an object-side surface of the first lens element and an image-side surface of the fourth lens element is Dr1r8, an axial distance between an object-side surface of the fifth lens element and an image-side surface of the seventh lens element is Dr9r14, and the following condition is satisfied:

$0.75<Dr1r8/Dr9r14<1.5.$

6. The photographing system of claim 1, wherein the sixth lens element has an object-side surface being convex in a paraxial region thereof and having at least one concave shape in an off-axis region thereof, and the image-side surface of the sixth lens element is concave in a paraxial region thereof and has at least one convex shape in the off-axis region thereof.

7. The photographing system of claim 1, wherein an absolute value of a focal length of the seventh lens element is a minimum among absolute values of focal lengths of all lens elements of the photographing system.

8. The photographing system of claim 1, wherein a curvature radius of an object-side surface of the fifth lens element and a curvature radius of an image-side surface of the fifth lens element have a same sign.

9. The photographing system of claim 1, wherein an absolute value of a curvature radius of an image-side surface of the fifth lens element is larger than an absolute value of a curvature radius of an object-side surface of the fifth lens element.

10. An image capturing unit, comprising:
the photographing system of claim 1; and
an image sensor disposed on an image surface of the photographing system.

11. An electronic device, comprising:
the image capturing unit of claim 10.

12. A photographing system comprising seven lens elements, the seven lens elements being, in order from an object side to an image side, a first lens element, a second lens element, a third lens element, a fourth lens element, a fifth lens element, a sixth lens element and a seventh lens element;
    wherein the first lens element has positive refractive power, the third lens element has negative refractive power, the fifth lens element has positive refractive power, the sixth lens element has an object-side surface being convex in a paraxial region thereof, the sixth lens element has an image-side surface having at least one inflection point in an off-axis region thereof, a total number of lens elements with refractive power in the photographing system is seven, an absolute value of a focal length of the third lens element is larger than an absolute value of a focal length of the second lens element, an absolute value of a curvature radius of an object-side surface of the second lens element is larger than an absolute value of a curvature radius of an image-side surface of the second lens element, and an absolute value of a curvature radius of an object-side surface of the seventh lens element is larger than an absolute value of a curvature radius of an image-side surface of the seventh lens element.

13. The photographing system of claim 12, wherein a focal length of the photographing system is f, the focal length of the third lens element is f3, a focal length of the fourth lens element is f4, a focal length of the fifth lens element is f5, and the following condition is satisfied:

$|f/f3|+|f/f4|+|f/f5|<1.5.$

14. The photographing system of claim 12, wherein a focal length of the photographing system is f, a composite focal length of the third lens element, the fourth lens element and the fifth lens element is f345, and the following condition is satisfied:

$-0.30<f/f345<0.60.$

15. The photographing system of claim 12, wherein an axial distance between the fourth lens element and the fifth lens element is larger than an axial distance between the third lens element and the fourth lens element, and the first lens element, the second lens element, the third lens element, the fourth lens element, the fifth lens element, the sixth lens element and the seventh lens element are all stationary relative to one another in a paraxial region thereof.

16. The photographing system of claim 12, wherein an axial distance between an object-side surface of the first lens element and an image-side surface of the fourth lens element is Dr1r8, an axial distance between an object-side surface of the fifth lens element and the image-side surface of the seventh lens element is Dr9r14, and the following condition is satisfied:

$0.75<Dr1r8/Dr9r14<1.5.$

17. The photographing system of claim 12, wherein the fourth lens element has an image-side surface being convex in a paraxial region thereof, and the image-side surface of the sixth lens element is concave in a paraxial region thereof.

18. The photographing system of claim 12, wherein an absolute value of a curvature radius of an image-side surface of the fifth lens element is larger than an absolute value of a curvature radius of an object-side surface of the fifth lens element.

19. The photographing system of claim 12, wherein the focal length of the second lens element is f2, the focal length of the third lens element is f3, a focal length of the fourth lens element is f4, a focal length of the fifth lens element is f5, a focal length of the sixth lens element is f6, a focal length of the seventh lens element is f7, a focal length of the x-th lens element is fx, and the following condition is satisfied:

$|f7|<|fx|,$ wherein $x=2,3,4,5,6.$

20. The photographing system of claim 12, wherein an axial distance between the third lens element and the fourth lens element is larger than an axial distance between the first lens element and the second lens element.

\* \* \* \* \*